(12) United States Patent
Akachi et al.

(10) Patent No.: US 11,691,640 B2
(45) Date of Patent: Jul. 4, 2023

(54) IN-VEHICLE APPARATUS AND CONTROL METHOD OF THE SAME

(71) Applicant: CLARION CO., LTD., Saitama (JP)

(72) Inventors: Masashi Akachi, Saitama (JP); Hiroshi Shojima, Saitama (JP); Kunio Sasada, Saitama (JP)

(73) Assignee: CLARION CO., LTD., Saitama (JP)

( * ) Notice: Subject to any disclaimer, the term of this patent is extended or adjusted under 35 U.S.C. 154(b) by 207 days.

(21) Appl. No.: 16/884,205

(22) Filed: May 27, 2020

(65) Prior Publication Data

US 2020/0406917 A1 Dec. 31, 2020

(30) Foreign Application Priority Data

Jun. 27, 2019 (JP) .................................. 2019-119626

(51) Int. Cl.
*B60W 50/14* (2020.01)
*G08G 1/01* (2006.01)
(Continued)

(52) U.S. Cl.
CPC ............. *B60W 50/14* (2013.01); *G06V 20/56* (2022.01); *G06V 20/59* (2022.01); *G06V 40/16* (2022.01);
(Continued)

(58) Field of Classification Search
CPC ........... B60W 50/14; B60W 2540/225; B60W 2540/229; G06V 20/59; G06V 40/16; G06V 20/56; G08G 1/0112
See application file for complete search history.

(56) References Cited

U.S. PATENT DOCUMENTS 7,924,171 B2 * 4/2011 Kawabata ............ B62D 15/027
340/435
2007/0089054 A1 4/2007 Morimoto
(Continued)

FOREIGN PATENT DOCUMENTS

CN 102930693 A 2/2013
CN 104665848 A 6/2015
(Continued)

OTHER PUBLICATIONS

Extended European Search Report mailed by European Patent Office dated Nov. 16, 2020 in corresponding European patent application No. 20182339.0-1207.
(Continued)

*Primary Examiner* — Dale W Hilgendorf
*Assistant Examiner* — Frank T Glenn, III
(74) *Attorney, Agent, or Firm* — IP Business Solutions, LLC

(57) ABSTRACT

An in-vehicle apparatus includes: a check direction determination unit determining a check direction for which the driver of an own vehicle needs a checking action for checking the safety based on a traveling direction of a roadway adjacent to a stall and an unparking direction; a direction information acquisition unit acquiring at least one of the line of sight or the facing direction of the face of the driver; a check occurrence determination unit setting a detection range of the line of sight based on the check direction, and determining whether or not at least the one is within the detection range so as to determine occurrence of the checking action; and a notification control unit controlling a display unit, a speaker, or a vibrator to execute a notification action when the check occurrence determination unit determines that the checking action has not occurred.

6 Claims, 18 Drawing Sheets

(51) Int. Cl.
    *G06V 20/56*     (2022.01)
    *G06V 20/59*     (2022.01)
    *G06V 40/16*     (2022.01)

(52) U.S. Cl.
    CPC ..... *G08G 1/0112* (2013.01); *B60W 2540/225* (2020.02); *B60W 2540/229* (2020.02)

(56) References Cited

U.S. PATENT DOCUMENTS

| | | | |
|---|---|---|---|
| 2015/0193664 A1* | 7/2015 | Marti | G08B 21/06 382/103 |
| 2016/0159397 A1* | 6/2016 | Baek | B60W 30/06 701/41 |
| 2016/0267335 A1* | 9/2016 | Hampiholi | B60K 28/06 |
| 2017/0371340 A1 | 12/2017 | Cohen et al. | |
| 2019/0135295 A1 | 5/2019 | Sato et al. | |
| 2019/0193725 A1 | 6/2019 | Suzuki et al. | |
| 2019/0275942 A1* | 9/2019 | Shimizu | G06V 20/59 |
| 2019/0351900 A1* | 11/2019 | Matsuda | G08G 1/143 |

FOREIGN PATENT DOCUMENTS

| | | |
|---|---|---|
| CN | 105083291 A | 11/2015 |
| EP | 1284432 A1 | 2/2003 |
| JP | H07-167668 A | 7/1995 |
| JP | 2003-327009 A | 11/2003 |
| JP | 2006-292403 A | 10/2006 |
| JP | 2007-094618 A | 4/2007 |
| JP | 2007-133692 A | 5/2007 |
| JP | 2007-253639 A | 10/2007 |
| JP | 2008-097278 A | 4/2008 |
| JP | 2017-215654 A | 12/2017 |
| WO | 2018047222 A1 | 3/2018 |
| WO | 2018/168512 A1 | 9/2018 |

OTHER PUBLICATIONS

Chinese Office Action mailed by Chinese Patent Office dated Jan. 25, 2022 in corresponding Chinese patent application No. 2020105747755.

Japanese Office Action mailed by Japanese Patent Office dated Mar. 14, 2023 in corresponding Japanese patent application No. 2019-119626.

* cited by examiner

| DRIVER ID | 001 | | | |
|---|---|---|---|---|
| IDENTIFICATION NUMBER | 001 | 002 | 003 | 004 |
| DATE/TIME INFORMATION | PARKING DATE/TIME 2019·6/10·11:35 UNPARKING DATE/TIME 2019·6/10·13:12 | PARKING DATE/TIME 2019·6/12·09:05 UNPARKING DATE/TIME 2019·6/13·19:47 | PARKING DATE/TIME 2019·6/21·07:55 UNPARKING DATE/TIME 2019·6/21·15:19 | ... |
| POSITIONAL INFORMATION | XXX.YYY | SSS.YOO | CCC.BBB | ... |
| TRAVELING DIRECTION | ONE WAY LEFT → RIGHT | TWO WAYS | ONE WAY RIGHT → LEFT | ... |
| PARKING DIRECTION | FORWARD | FORWARD | BACKWARD | ... |
| CHECK DIRECTION | LEFT | RIGHT, LEFT | REAR RIGHT SIDE | ... |

| DRIVER ID | 001 | FACE IMAGE | XXX.JPG | |
|---|---|---|---|---|
| IDENTIFICATION NUMBER | 001 | 002 | 003 | 004 |
| DIRECTION INFORMATION (LINE-OF-SIGHT DIRECTION, HEAD FACING DIRECTION) | $\theta a=52°, 54° \cdots$<br>$\theta b=49°, 52° \cdots$ | $\theta a=46°, -43° \cdots$<br>$\theta b=39°, -40° \cdots$ | $\theta a=112°, 124° \cdots$<br>$\theta b=110°, 119° \cdots$ | ... |
| CHECK DIRECTION | LEFT | LEFT AND RIGHT | RIGHT | ... |
| NOTIFICATION ACTION | ATTENTION TO LEFT | ATTENTION TO RIGHT | NONE | ... |
| NOTIFICATION FLAG | 1 | 1 | 0 | ... |
| ACCUMULATED VALUE | 1 | 1 | 0 | ... |

| UNPARKING DIRECTION | TRAVELING DIRECTION OF ROADWAY | CHECK DIRECTION | DETECTION RANGE |
|---|---|---|---|
| FORWARD | LEFT ⇒ RIGHT | LEFT | $\theta 4 \leqq \theta \leqq \theta 5$ |
| FORWARD | RIGHT ⇒ LEFT | RIGHT | $\theta 1 \leqq \theta \leqq \theta 2$ |
| FORWARD | TWO WAYS | LEFT AND RIGHT | $\theta 4 \leqq \theta \leqq \theta 5$<br>$\theta 1 \leqq \theta \leqq \theta 2$ |
| BACKWARD | LEFT ⇒ RIGHT | REAR LEFT SIDE | $\theta 5 < \theta \leqq \theta 6$ |
| BACKWARD | RIGHT ⇒ LEFT | REAR RIGHT SIDE | $\theta 2 < \theta \leqq \theta 3$ |
| BACKWARD | TWO WAYS | REAR LEFT SIDE AND REAR RIGHT SIDE | $\theta 5 < \theta \leqq \theta 6$<br>$\theta 2 < \theta \leqq \theta 3$ |

IN-VEHICLE APPARATUS AND CONTROL METHOD OF THE SAME

INCORPORATION BY REFERENCE

The present application claims priority under 35 U.S.C. § 119 to Japanese Patent Application No. 2019-119626 filed on Jun. 27, 2019. The content of the application is incorporated herein by reference in its entirety.

BACKGROUND OF THE INVENTION

Field of the Invention

The present invention relates to an in-vehicle apparatus and a control method of the in-vehicle apparatus.

Description of the Related Art

Conventionally, there is known an apparatus that assists driving operations of drivers. For example, Japanese Patent Laid-Open No. 2008-97278 discloses a drive assist apparatus that assists driving only when necessary. The drive assist apparatus includes: predicted route detection means that detects a predicted route of a vehicle; line-of-sight direction detection means that detects the line-of-sight direction of a driver; visual inspection means that, when the predicted route detection means detects that the vehicle turns right or turns left, determines whether or not the line-of-sight direction of the driver is directed to gaze at a visual inspection area including the predicted route detected by the predicted route detection means; and assist means that assists a driving operation of the driver when determined that the driver has not gaze at the visual inspection area.

When unparking a vehicle parked in a parking lot, it is necessary to secure the safety with high accuracy.

An aspect of the present invention is designed in view of the aforementioned circumstance, and an object is to improve the safety when unparking the vehicle parked in a parking lot.

SUMMARY OF THE INVENTION

In order to achieve the object, the in-vehicle apparatus according to an aspect of the present invention includes: an unparking direction determination unit that determines an unparking direction of an own vehicle in which the in-vehicle apparatus is loaded; an acquisition unit that acquires parking-lot map information including information of a traveling direction of a roadway within a parking lot based on positional information showing a position of the own vehicle; a roadway specification unit that specifies the roadway adjacent to a stall where the own vehicle is parked based on the parking-lot map information acquired by the acquisition unit, the positional information, and the unparking direction; a check direction determination unit that determines a check direction for which a driver of the own vehicle needs to do a checking action for checking safety before the own vehicle enters the roadway based on the traveling direction of the roadway specified by the roadway specification unit and the unparking direction; a direction information acquisition unit that acquires direction information showing at least one of a line of sight or a facing direction of a face of the driver driving the own vehicle; a check occurrence determination unit that sets a detection range based on the check direction determined by the check direction determination unit, and determines whether or not at least one of the line of sight or the facing direction of the face of the driver acquired by the direction information acquisition unit is within the detection range so as to determine occurrence of the checking action; and a notification control unit that controls a notification unit to execute a notification action when the check occurrence determination unit determines that the checking action has not occurred.

The in-vehicle apparatus includes a tendency detection unit that detects a driving tendency of the driver, wherein the tendency detection unit may: store, in a storage unit, records in which the check direction determined by the check direction determination unit, the direction information acquired by the direction information acquisition unit, and occurrence information showing whether or not the notification action has occurred; and calculate an accumulated value of the number of records in which the occurrence information shows that the notification action has occurred, and the check direction determined by the check direction determination unit and the direction information acquired by the direction information acquisition unit are consistent, and when the calculated accumulated value is equal to or more than a set number, give an instruction to the notification control unit to execute the notification action.

In the in-vehicle apparatus, the tendency detection unit may: acquire, from the storage unit, the records in which the check direction same as the check direction determined by the check direction determination unit is registered, when the check occurrence determination unit determines that the checking action has occurred; and among the acquired records, change the occurrence information of the records indicating that the notification action has occurred to the occurrence information indicating that the notification action has not occurred, when determined that the checking action continuously occurs for a plurality of times for the check direction based on the acquired records.

The in-vehicle apparatus includes a vehicle information acquisition unit that acquires vehicle information of the own vehicle, wherein the unparking direction determination unit may determine a parking direction of the own vehicle based on a car speed and operation position information of a shift lever included in the vehicle information, and determine the unparking direction based on the determined parking direction.

A control method of an in-vehicle apparatus according to an aspect of the present invention includes: an unparking direction determination step of determining an unparking direction of an own vehicle in which the in-vehicle apparatus is loaded; an acquisition step of acquiring parking-lot map information including information of a traveling direction of a roadway within a parking lot based on positional information showing a position of the own vehicle; a roadway specification step of specifying the roadway adjacent to a stall where the own vehicle is parked based on the parking-lot map information acquired by the acquisition step, the positional information, and the unparking direction; a check direction determination step of determining a check direction for which a driver of the own vehicle needs to do a checking action for checking safety before the own vehicle enters the roadway based on the traveling direction of the roadway specified by the roadway specification step and the unparking direction; a direction information acquisition step of acquiring direction information showing at least one of a line of sight or a facing direction of a face of the driver driving the own vehicle; a check occurrence determination step of setting a detection range based on the check direction determined by the check direction determination step, and determining whether or not at least one of the line of sight or the facing direction of the face of the driver acquired by the direction information acquisition step is within the detection range so as to determine occurrence of the checking action; and a notification step of controlling a notification unit to execute a notification action when determined by the check occurrence determination step that the checking action has not occurred.

The control method of the in-vehicle apparatus includes a tendency detection step of detecting a driving tendency of the driver, wherein, in the tendency detection step: records in which the check direction determined by the check direction determination step, the direction information acquired by the direction information acquisition step, and occurrence information showing whether or not the notification action has occurred may be stored in a storage unit; and an accumulated value of the number of records in which the occurrence information shows that the notification action has occurred, and the check direction determined by the check direction determination step and the direction information acquired by the direction information acquisition step are consistent may be calculated, and when the calculated accumulated value is equal to or more than a set number, the notification action may be executed by the notification unit.

In the control method of the in-vehicle apparatus, in the tendency detection step: the records in which the check direction same as the check direction determined by the check direction determination step is registered may be acquired from the storage unit, when determined in the check occurrence determination step that the checking action has occurred; and among the acquired records, the occurrence information of the records indicating that the notification action has occurred may be changed to the occurrence information indicating that the notification action has not occurred, when determined that the checking action continuously occurs for a plurality of times for the check direction based on the acquired records.

The control method of the in-vehicle apparatus includes a vehicle information acquisition step of acquiring vehicle information of the own vehicle, wherein, in the unparking direction determination step, a parking direction of the own vehicle may be determined based on a car speed and operation position information of a shift lever included in the vehicle information, and the unparking direction may be determined based on the determined parking direction.

With the aspects of the present invention, it is possible to improve the safety when unparking the vehicle parked in a parking lot.

BRIEF DESCRIPTION OF THE DRAWINGS

FIG. 2 is a chart showing a configuration of a loading/unloading record DB;

FIG. 3 is a chart showing a configuration of a driver DB;

FIG. 4 is a chart showing a configuration of a check direction table;

DETAILED DESCRIPTION OF THE PREFERRED EMBODIMENTS

Hereinafter, an embodiment of the present invention will be described by referring to the accompanying drawings.

Figure 1:
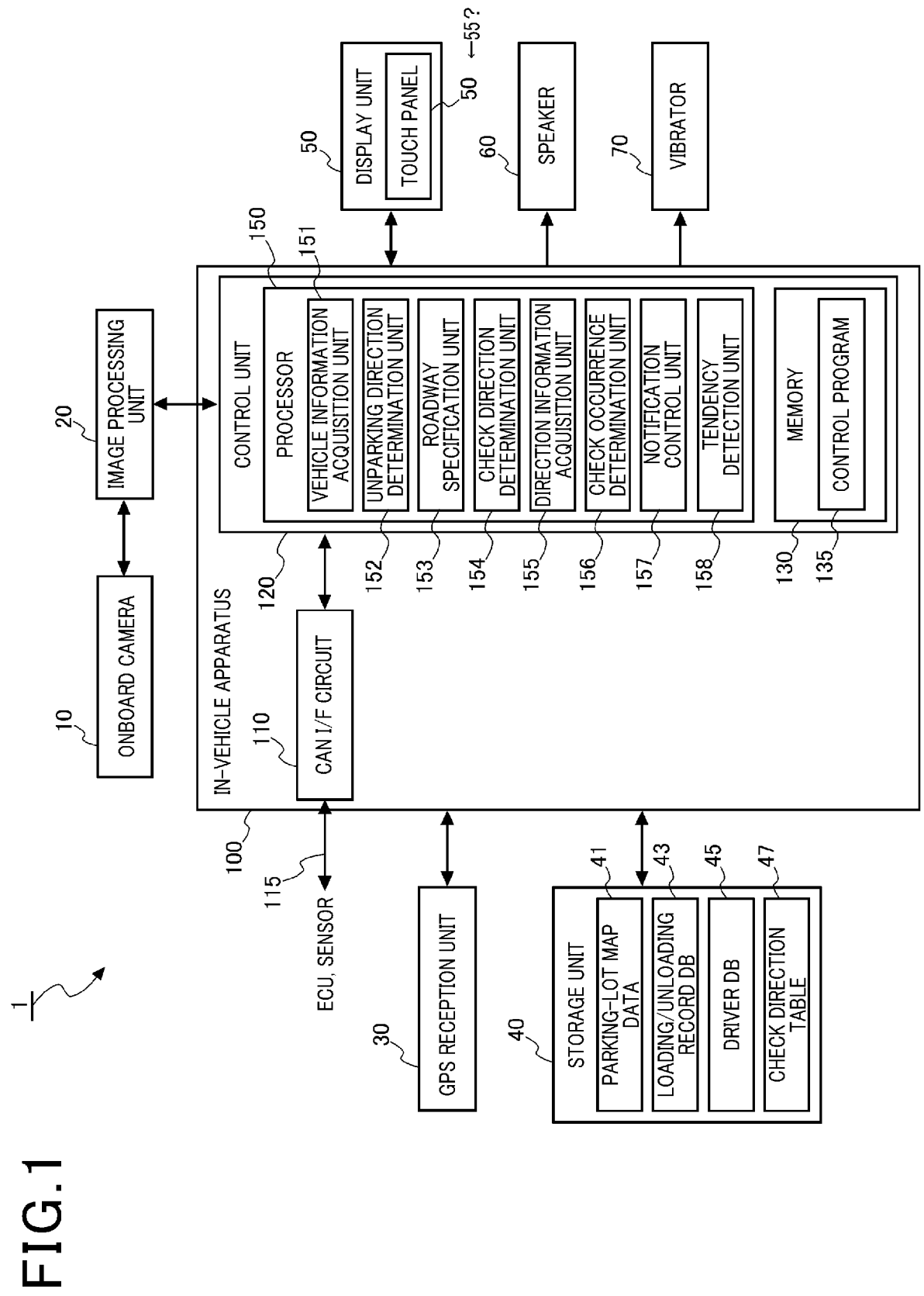
FIG. 1 is a schematic diagram showing a configuration of a safe drive assist apparatus.

FIG. 1 is a schematic diagram showing a configuration of a safe drive assist apparatus 1 to which the present invention is applied.

The configuration of the safe drive assist apparatus 1 will be described by referring to FIG. 1.

The safe drive assist apparatus 1 is loaded on vehicles 5, and detects the line-of-sight directions of the driver driving the vehicles 5. The safe drive assist apparatus 1 determines occurrence of a safety check for the check directions requiring the safety check of the driver based on the detected line-of-sight direction. Then, when the driver neglects the safety check for the check directions, the safe drive assist apparatus 1 notifies the driver that the safety check is neglected. The vehicle on which the safe drive assist apparatus 1 is loaded is expressed as "own vehicle 5A", while the vehicles other than the own vehicle 5A are expressed as "other vehicles 5B".

The safe drive assist apparatus 1 includes an onboard camera 10, an image processing unit 20, a GPS (Global Positioning System) reception unit 30 (GPS receiver), a storage unit 40, a display unit 50, a speaker 60, a vibrator 70, and an in-vehicle apparatus 100. The display unit 50, the speaker 60, and the vibrator 70 correspond to "notification unit" of the present invention.

The onboard camera 10 is configured with a visible light camera or the like. The onboard camera 10 is disposed to be able to capture the face of the driver seated on a driver seat of the own vehicle 5A from the front. An image capturing range of the onboard camera 10, when the driver is seated on the driver seat, is a spatial domain where the face of the driver is located. The onboard camera 10 captures images of the driver seated on the driver seat, and outputs captured images including the face of the driver to the image processing unit 20. Note that the onboard camera 10 may be configured with an infrared camera and an infrared LED.

The captured images of the onboard camera 10 are inputted to the image processing unit 20.

The image processing unit 20 detects the line of sight of the driver by processing the inputted captured image. The image processing unit 20 first extracts a face area that is the area capturing the face of the driver from the inputted captured image. For example, the image processing unit 20 extracts the face area by a generally known method such as skin color extraction.

Then, the image processing unit 20 detects feature points such as inner corners and outer corners of the eyes, corners of the mouth, and the like from the extracted face area, and detects the facing direction of the face of the driver based on the positions of the detected feature points. Further, the image processing unit 20 detects the ears of the driver from the captured image, and detects the facing direction of the face of the driver based on the positions and facing direction of the detected ears. By detecting the facing direction of the face of the driver based on the positions and the facing directions of the ears and the like, it is possible to detect the facing direction of the face of the driver even when the driver has the head facing toward the rear side of the own vehicle 5A. The method for detecting the facing direction of the face is well known, so that detailed explanations are omitted.

Then, the image processing unit 20 specifies positions of the inner corners of the eyes and irises from the face area, and specifies the line-of-sight direction of the driver based on the positions of the specified inner corners of the eyes and irises. The method for specifying the direction of lines of sight is well known, so that detailed explanations are omitted. The image processing unit 20 outputs information showing the detected facing direction of the face and the line-of-sight direction of the driver to the in-vehicle apparatus 100.

Note that the onboard camera 10 is disposed to be able to capture the face of the driver seated on the driver seat from the front. Therefore, when the driver is facing the rear right side or the rear left side, it is not possible to detect the line of sight from the captured image of the onboard camera 10. In such case, the image processing unit 20 detects only the facing direction of the face, and outputs the information showing the detected facing direction of the face to the in-vehicle apparatus 100.

The image processing unit 20 may be a configuration that includes a memory and a processor, and implements the above-described processing by executing a control program stored in the memory by the processor. The processor may be configured with a processor 150 that is described later and provided to the in-vehicle apparatus 100, or may be configured with a processor different from the processor 150. Further, the image processing unit 20 may also be configured with a dedicated hardware circuit.

Further, while the facing direction of the face of the driver and the direction of the line of sight of the driver are specified from the captured image of the visible light camera in the present embodiment, it is also possible to irradiate infrared rays to the face of the driver by the infrared LED, and capture the irradiated infrared rays by an infrared camera to detect the light-of-sight direction of the driver.

The GPS reception unit 30 receives positioning signals transmitted from a GPS satellite, and calculates the absolute position (latitude and longitude) of the own vehicle 5A based on the received positioning signals. The GPS reception unit 30 outputs positional information showing the calculated absolute position of the own vehicle 5A to the in-vehicle apparatus 100.

The storage unit 40 is a storage apparatus (memory) such as an HDD (Hard Disk Drive), an SSD (Solid State Drive), or an USB (Universal Serial Bus), for example, and stores the control program to be executed by the processor 150 to be described later and various kinds of data.

Further, the storage unit 40 stores parking-lot map data (corresponding to parking-lot map information) 41 that is a map within a parking lot. The parking-lot map data 41 includes information showing stalls of the parking lot and information showing the traveling direction of a roadway within the parking lot. The stall is an area where a vehicle can be parked, and it is an area sectioned by a white line or the like. The roadway is a passage for allowing vehicles to park in the stalls and a space for turning the steering wheels. Further, the traveling direction means the direction to which the vehicles 5 can travel on the roadway. As for the traveling directions, there are one-way traffic and two-way traffic.

Further, the storage unit 40 stores a loading/unloading record database 43, a driver database 45, and a check direction table 47. Hereinafter, the database is abbreviated as "DB".

FIG. 2 is a chart showing a configuration of the loading/unloading record DB 43.

One record of the loading/unloading record DB 43 includes "identification number" that is identification information, "date/time information", "positional information", "traveling direction", "parking direction", and "check direction". Each record is registered in the loading/unloading record DB 43 by being associated with the driver ID that is the identification information of the driver.

The date/time information includes the data/time at which the own vehicle 5A is parked, and the date/time at which the ignition switch is turned on and the own vehicle 5A is unparked.

The positional information is the information showing the parked position where the own vehicle 5A is parked. The positional information is the positional information calculated by the GPS reception unit 30.

The traveling direction is the information showing the traveling direction of the roadway specified by a roadway specification unit 153 to be described later.

The parking direction is the information showing the direction of the own vehicle 5A when the own vehicle 5A is parked in the stall. As for the parking directions, there are forward parking and backward parking. The forward parking is a parking manner that has the front wheels of the own vehicle 5A entered first into the stall. The backward parking is a parking manner that has the rear wheels of the own vehicle 5A entered first into the stall.

The check direction is the direction for which the driver needs to do a safety check before unparking the own vehicle 5A.

FIG. 3 is a chart showing a configuration of the driver DB 45.

One record of the driver DB 45 includes "identification number" that is the identification information, "line-of-sight direction and facing direction of head", "check direction", "notification action", "notification flag", and "accumulated value". Each record is registered in the driver DB 45 by being associated with the driver ID that identifies the driver. Further, in the driver DB 45, a face image of the driver is registered by being associated with the driver ID of the driver.

The line-of-sight direction is the information showing the line-of-sight direction of the driver detected by the image processing unit 20.

The facing direction of the head is the information showing the facing direction of the head of the driver detected by the image processing unit 20. As for the line-of-sight direction, the line of sight of the driver cannot be detected when the driver is facing toward the rear side of the own vehicle 5A. Therefore, when the driver is facing towards the rear side, the information showing the facing direction of the head is registered in the driver DB 45. The line-of-sight direction and the facing direction of the head are collectively referred to as direction information. Further, in FIG. 3, θa shows an angle indicating the line-of-sight direction, and θb shows an angle indicating the direction of the head of the driver.

The check direction is the information same as the check direction registered in the loading/unloading record DB 43.

The notification action is the information showing the contents of the notification action for the driver by the safe drive assist apparatus 1.

As for the notification flag, "1" is recorded when a notification action by the safe drive assist apparatus 1 occurs, and "0" is recorded when the notification action does not occur.

The accumulated value shows the number of "1" recorded in the notification flags of the records having the same line-of-sight direction and the same check direction, that is, the number of times of notification actions executed for the driver.

FIG. 4 is a chart showing a configuration of the check direction table 47.

The check direction table 47 is a table in which "unparking direction", "traveling direction of roadway", "check direction", and "detection range" are registered in an associated manner. The unparking direction is the information showing the direction toward which the vehicles 5 are unparked. The detection range is the information of the range where the line of sight or the facing direction of the head of the driver is detected in order to determine whether or not the driver has checked the check direction.

In a case where the unparking direction of the vehicle 5A is a forward direction and the traveling direction of the roadway is from the left to the right, "left direction" is registered in the check direction table 47 as the check direction. Further, "θ4≤θ≤θ5" is registered as the detection range when the check direction is the left direction.

Meanwhile, in a case where the unparking direction of the vehicle 5A is the forward direction and the traveling direction of the roadway is from the right to the left, "right direction" is registered in the check direction table 47 as the check direction. Further, "θ1≤θ≤θ2" is registered as the detection range when the check direction is the right direction.

In a case where the unparking direction of the vehicle 5A is the forward direction and the traveling directions on the roadway are two ways, "left direction and right direction" is registered as the check direction in the check direction table 47. Further, "θ4≤θ≤θ5" and "θ1≤θ≤θ2" are registered as the detection range when the check directions are the left direction and the right direction.

Further, in a case where the unparking direction of the vehicle 5A is the backward direction and the traveling direction of the roadway is from the left to the right, "rear left side" is registered in the check direction table 47 as the check direction. Further, "θ5<θ≤θ6" is registered as the detection range when the check direction is the rear left side.

Further, in a case where the unparking direction of the vehicle 5A is the backward direction and the traveling direction of the roadway is from the right to the left, "rear right side" is registered in the check direction table 47 as the check direction. Further, "θ2<θ≤θ3" is registered as the detection range when the check direction is the rear right side.

Further, in a case where the unparking direction of the vehicle 5A is the backward direction and the traveling directions on the roadway are two ways, "rear left side and rear right side" is registered as the check direction in the check direction table 47. Further, "θ5<θ≤θ6" and "θ2<θ≤θ3" are registered as the detection range when the check directions are the rear left side and the rear right side.

Now, the detection range will be described by referring to FIG. 5.

Figure 5:
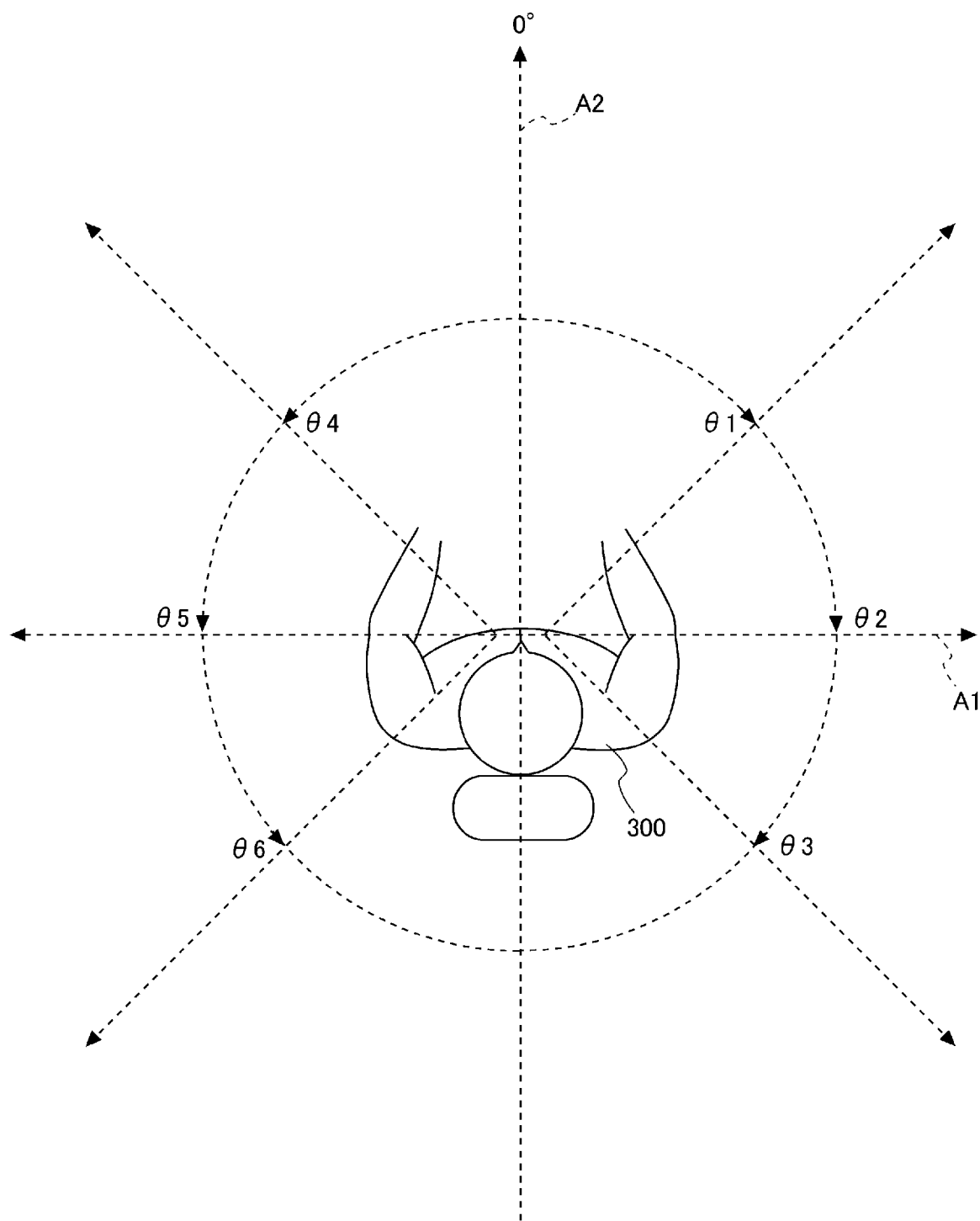
FIG. 5 is a diagram showing a detection range.

FIG. 5 is a diagram showing the detection range. In FIG. 5, a horizontal axis A1 and a forward axis A2 are shown. The horizontal axis A1 is the axis set by having the driver seated on the driver seat as the reference, and it is the axis parallel to the horizontal direction (left-and-right direction) of the driver. The forward axis A2 is the axis also set by having the driver seated on the driver seat as the reference, and it is set in the direction orthogonal to the horizontal axis A1.

For example, when the check direction is the left direction, a range of θ4≤θ≤θ5 in the left direction with respect to the forward axis A2 is set as the detection range.

Further, when the check direction is the right direction, a range of θ1≤θ≤θ2 in the right direction with respect to the forward axis A2 is set as the detection range.

Further, when the check direction is the rear left side, a range of θ5<θ≤θ6 in the rear left side with respect to the forward axis A2 is set as the detection range.

Further, when the check direction is the rear right side, a range of θ2<θ≤θ3 in the rear right side with respect to the forward axis A2 is set as the detection range.

The display unit 50 includes a display such as a liquid crystal panel or an organic EL (Electro Luminescent) panel, for example, and displays images on the display according to control of a control unit 120 to be described later.

The speaker 60 converts sound signals inputted from the control unit 120 into sound and outputs the sound. The speaker 60 emits a voice announcement or an alarm sound, for example.

The vibrator 70 is placed in the driver seat or the like of the own vehicle 5A, for example. Drive signals are inputted to the vibrator 70 from the in-vehicle apparatus 100. The vibrator 70 vibrates according to the inputted drive signals, and outputs a warning to the driver seated on the driver seat. For the vibrator 70, a vibrator of a generally known configuration such as an eccentric motor, a linear vibrator, or a piezoelectric element is used.

Next, the configuration of the in-vehicle apparatus 100 will be described. The in-vehicle apparatus 100 includes a CAN (Controller Area Network) interface circuit 110, and the control unit 120. The CAN interface circuit 110 is abbreviated as "CAN I/F circuit 110" hereinafter.

The CAN I/F circuit 110 performs data communication according to a CAN protocol with other ECUs (Electronic Control Units) and sensors connected to a CAN bus 115.

The control unit 120 includes a memory 130 and the processor 150.

The memory 130 includes a volatile storage apparatus and a nonvolatile storage apparatus. The volatile storage apparatus is configured with a RAM (Random Access Memory), for example. The nonvolatile storage apparatus is configured with a ROM (Read Only Memory) or an EEPROM (Electrically Erasable Programmable Rom), for example. Further, the memory 130 may be configured to include only the nonvolatile storage apparatus. The memory 130 stores a control program 135 to be executed by the processor 150.

The processor 150 is an arithmetic processing unit configured with a CPU (Central Processing Unit) or an MPU (Micro Processing Unit). The processor 150 controls the safe drive assist apparatus 1 by executing the control program 135. The processor 150 may be configured with a single processor or may be configured with a plurality of processors. Further, the processor 150 may be configured with an SoC (System on Chip) in which a part of or a whole part of the memory 130 and other circuits are integrated. Further, the processor 150 may be configured with a combination of the CPU that executes the program and a DSP (Digital Signal Processor) that executes prescribed arithmetic processing. Furthermore, whole functions of the processor 150 may be mounted on hardware, or the processor 150 may be configured by using a programmable device.

As functional blocks, the control unit 120 includes a vehicle information acquisition unit 151, an unparking direction determination unit 152, a roadway specification unit 153, a check direction determination unit 154, a direction information acquisition unit 155, a check occurrence determination unit 156, a notification control unit 157, and a tendency detection unit 158. These functional blocks are the blocks showing the functions that are implemented by the processor 150 through performing calculations and control of data by executing instruction sets written in the control program 135.

The vehicle information acquisition unit 151 acquires vehicle information from other ECUs (Electric Control Units) and sensors connected to the CAN bus 115 via the CAN I/F circuit 110. The vehicle information acquired by the vehicle information acquisition unit 151 includes operation position information showing operation positions of a shift lever, on/off information of the ignition switch, car-speed information of the own vehicle 5A, information showing depression amount of a foot brake, on/off information of a parking brake, and information showing steering angles of the steering wheel.

The unparking direction determination unit 152 determines the unparking direction when the own vehicle 5A parked in a stall of a parking lot is unparked from the stall. For example, the unparking direction determination unit 152 determines the unparking direction based on the parking direction of the vehicle 5A when parked in the stall.

Further, the unparking direction determination unit 152 may determine the parking direction based on a moving route of the own vehicle 5A until parking in the stall, the steering angles of the steering wheel and the operation position information of the shift lever included in the vehicle information acquired by the vehicle information acquisition unit 151. The unparking direction determination unit 152 calculates the moving route within the parking lot based on the parking-lot map data read out from the storage unit 40 and the positional information calculated by the GPS reception unit 30.

Further, the unparking direction determination unit 152 may determine the unparking direction of the own vehicle 5A based on the operation position information of the shift lever. That is, the unparking direction determination unit 152 determines the unparking direction of the own vehicle 5A as the forward direction when the operation position of the shift lever is changed to drive from parking after the engine is started. Further, the unparking direction determination unit 152 determines the unparking direction of the own vehicle 5A as the backward direction when the operation position of the shift lever is changed to reverse from parking after the engine is started.

In the roadway specification unit 153, the positional information calculated by the GPS reception unit 30 and the information showing the unparking direction of the own vehicle 5A determined by the unparking direction determination unit 152 are inputted. The roadway specification unit 153 reads out the parking-lot map data of the surrounding of the own vehicle 5A from the storage unit 40 based on the inputted positional information. The roadway specification unit 153 specifies the roadway which is adjacent to the stall where the own vehicle 5A is parked, and is located in the unparking direction based on the read-out parking-lot map data 41 and the unparking direction determined by the unparking direction determination unit 152. That is, the roadway specification unit 153 specifies the roadway on which the own vehicle 5A unloaded from the stall runs first. The roadway specification unit 153 corresponds to "acquisition unit and roadway specification unit" of the present invention.

Further, the roadway specification unit 153 may calculate the position of a startup part based on the positional information calculated by the GPS reception unit 30, and specify the roadway based on the calculated position.

The position in the positional information calculated by the GPS reception unit 30 is the position of the GPS reception unit 30 that has received the positioning signal. When the unparking direction of the own vehicle 5A is the forward direction, the roadway specification unit 153 calculates the positional information of a predetermined position of a front bumper based on the positional information. The position of the predetermined position of the front bumper is the startup part. The azimuth and distance of the startup part with respect to the GPS reception unit 30 are calculated in advance and stored in the memory 130.

Further, when the unparking direction of the own vehicle 5A is the backward direction, the roadway specification unit 153 calculates the positional information of a predetermined position of a rear bumper based on the positional information. The position of the predetermined position of the rear bumper is the startup part. The roadway specification unit 153 specifies the roadway that is located in the unparking direction of the own vehicle 5A and at the distance closest to the startup part.

The check direction determination unit 154 corresponds to "direction determination unit" of the present invention, and acquires the traveling direction of the roadway specified by the roadway specification unit 153 from the parking-lot map data 41. Further, the check direction determination unit 154 refers to the check direction table 47 based on the unparking direction of the own vehicle 5A determined by the unparking direction determination unit 152 and the acquired traveling direction of the roadway, and acquires the information regarding the check direction for which the driver needs to do a checking action and the detection range. The checking action is an action of the driver for checking the safety visually.

Figure 6:
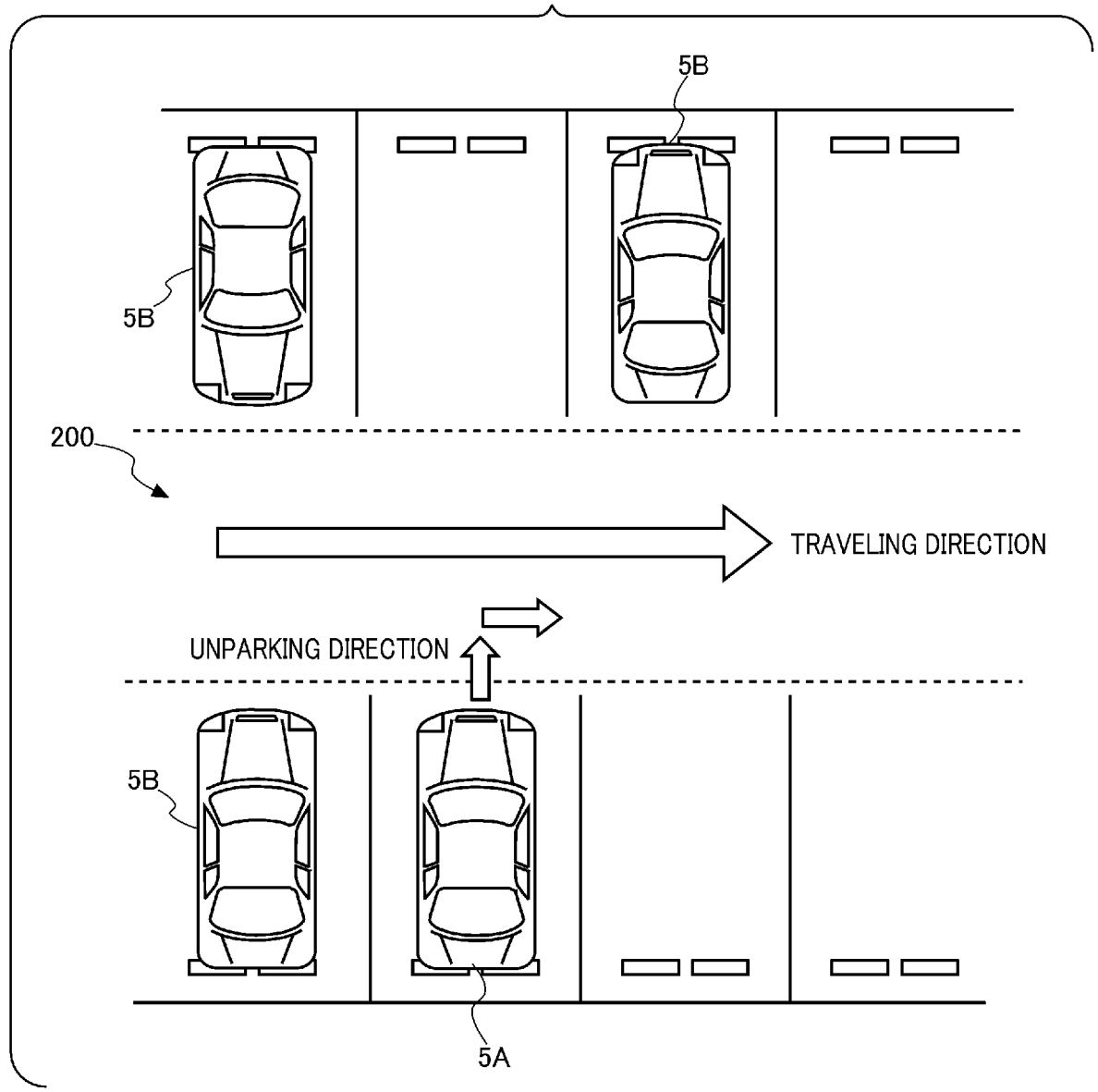
FIG. 6 is a diagram showing a case where a traveling direction of a roadway is toward the right direction and an own vehicle is parked backward.

FIG. 6 shows a case where the traveling direction of a roadway 200 is from the left to the right viewed from the driver seated on the driver seat. Further, FIG. 6 shows a case where the parking direction of the own vehicle 5A is backward parking, and the unparking direction of the own vehicle 5A is the forward direction. In this case, the check direction determination unit 154 refers to the check direction table 47, and acquires "left direction" as the check direction and $θ4 ≤ θ ≤ θ5$ as the detection range. The right direction is not included in the check direction, because it is naturally expected to do the safety check in the right direction that is the traveling direction of the own vehicle 5A.

Figure 7:
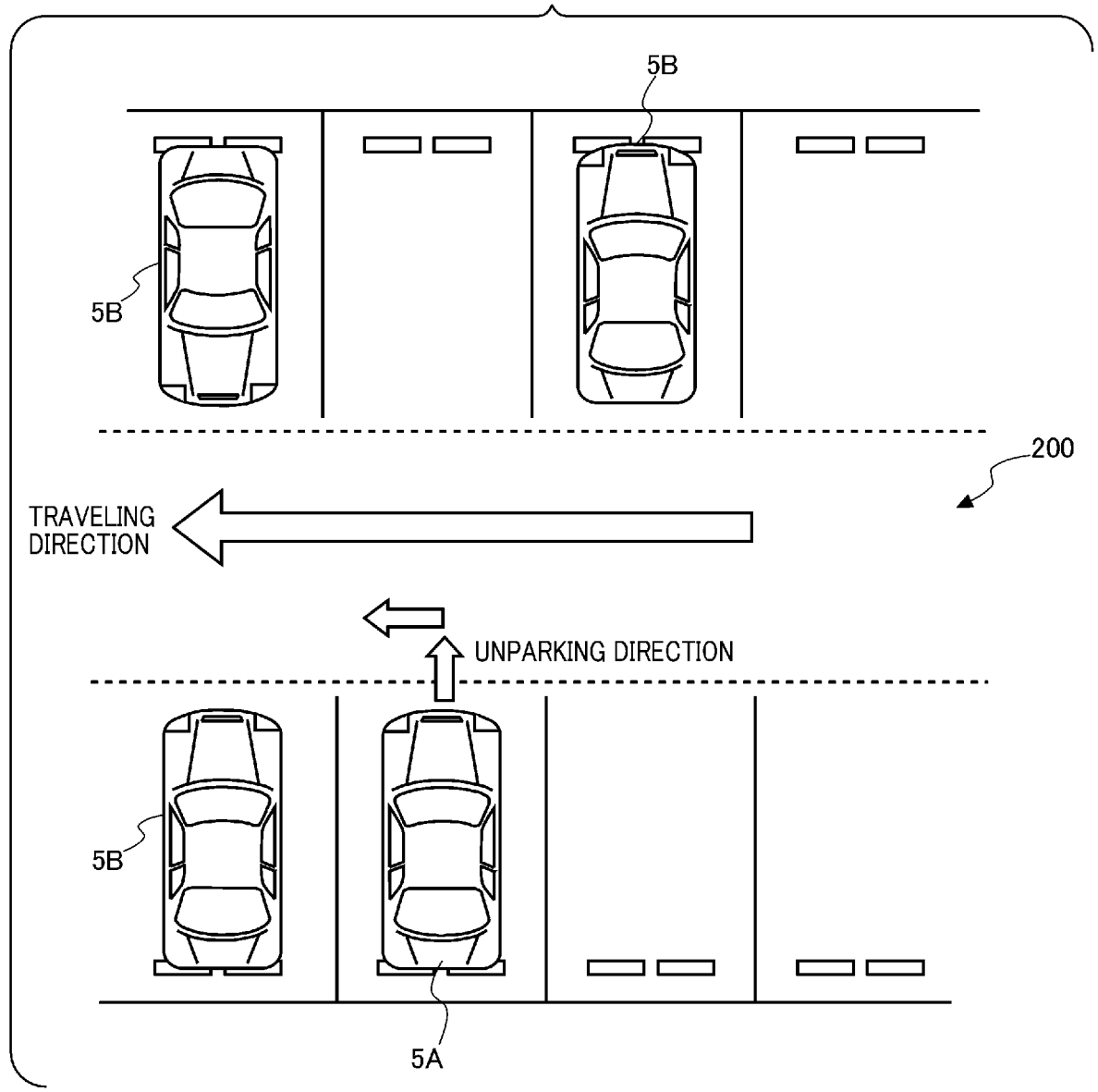
FIG. 7 is a diagram showing a case where the traveling direction of a roadway is toward the left direction and the own vehicle is parked backward.

FIG. 7 shows a case where the traveling direction of the roadway 200 is from the right to the left viewed from the driver seated on the driver seat. Further, FIG. 7 shows a case where the parking direction of the own vehicle 5A is backward parking, and the unparking direction of the own vehicle 5A is the forward direction. In this case, the check direction determination unit 154 refers to the check direction table 47, and acquires "right direction" as the check direction and θ1≤θ≤θ2 as the detection range.

Figure 8:
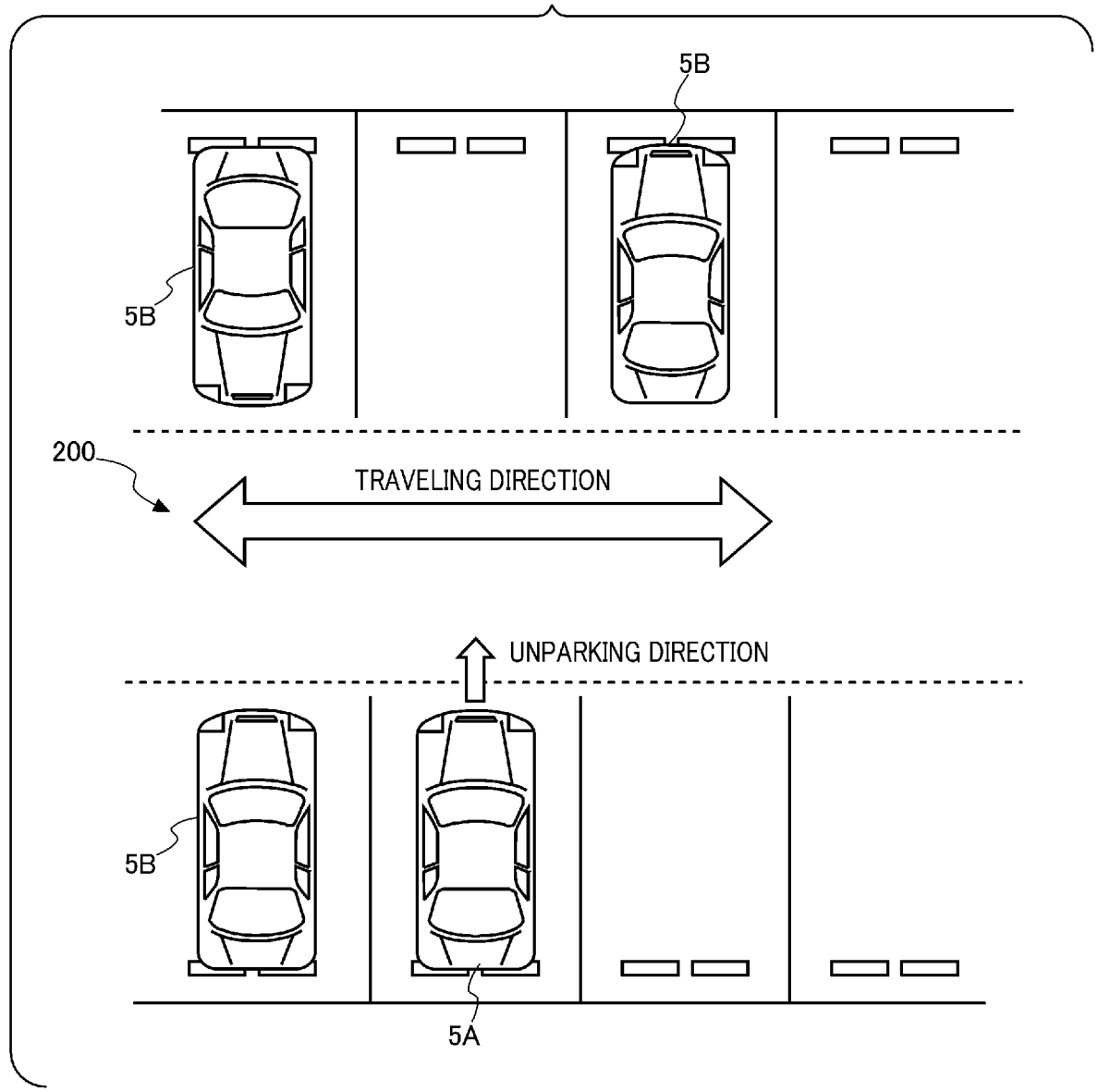
FIG. 8 is a diagram showing a case where the traveling direction of a roadway is toward both directions and the own vehicle is parked backward.

FIG. 8 shows a case where the traveling directions on the roadway 200 are two ways viewed from the driver seated on the driver seat. Further, FIG. 8 shows a case where the parking direction of the own vehicle 5A is backward parking, and the unparking direction of the own vehicle 5A is the forward direction. When the traveling directions on the roadway 200 are two ways, "right direction and left direction" is set as the check direction because there is a possibility that the other vehicles 5B are approaching from both the left and right directions. The check direction determination unit 154 refers to the check direction table 47, and acquires "left direction and right direction" as the check directions and θ4≤θ≤θ5 and θ1≤θ≤θ2 as the detection range.

Figure 9:
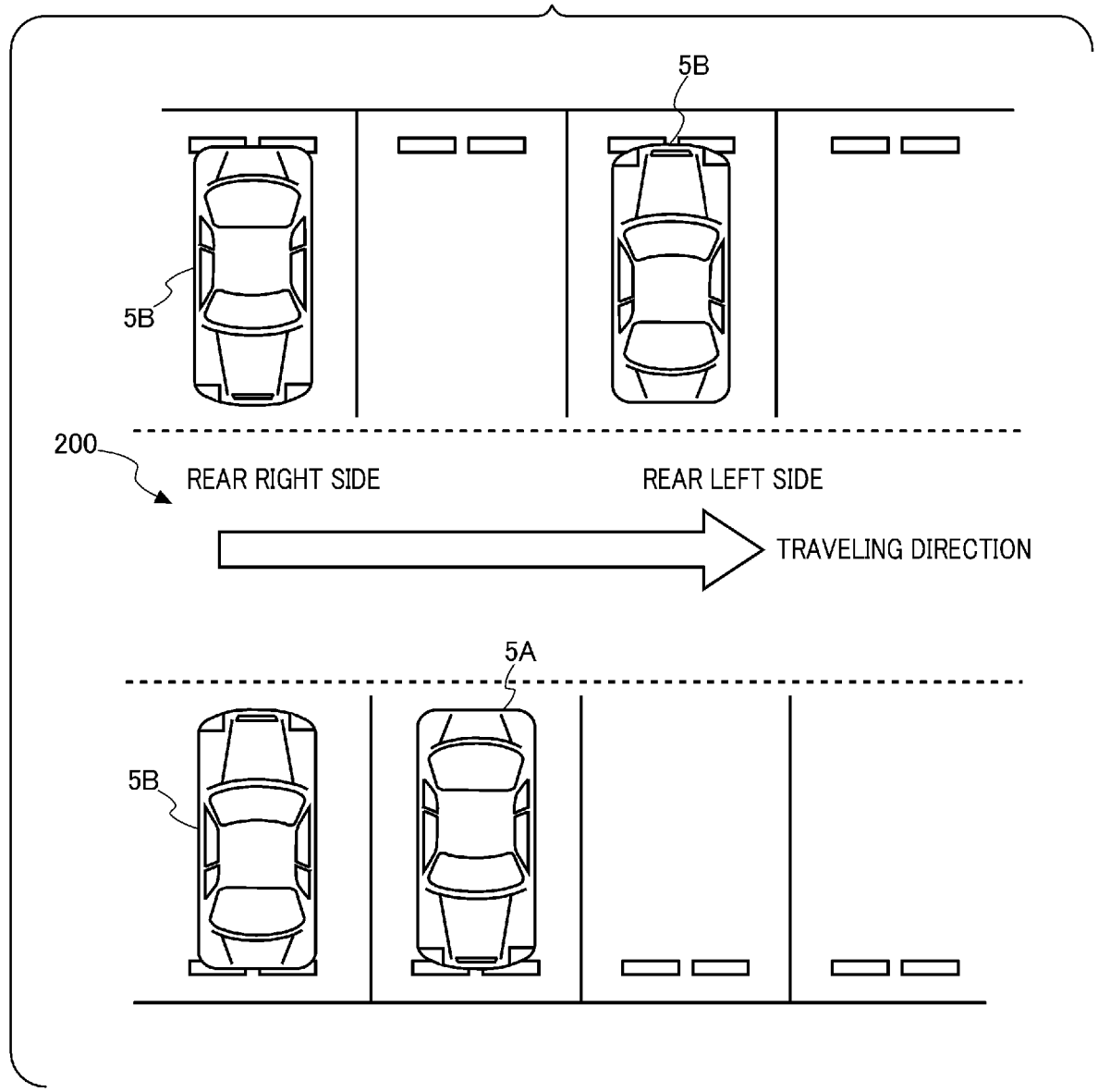
FIG. 9 is a diagram showing a case where the traveling direction of a roadway is toward the right direction and the own vehicle is parked forward.
Figure 10:
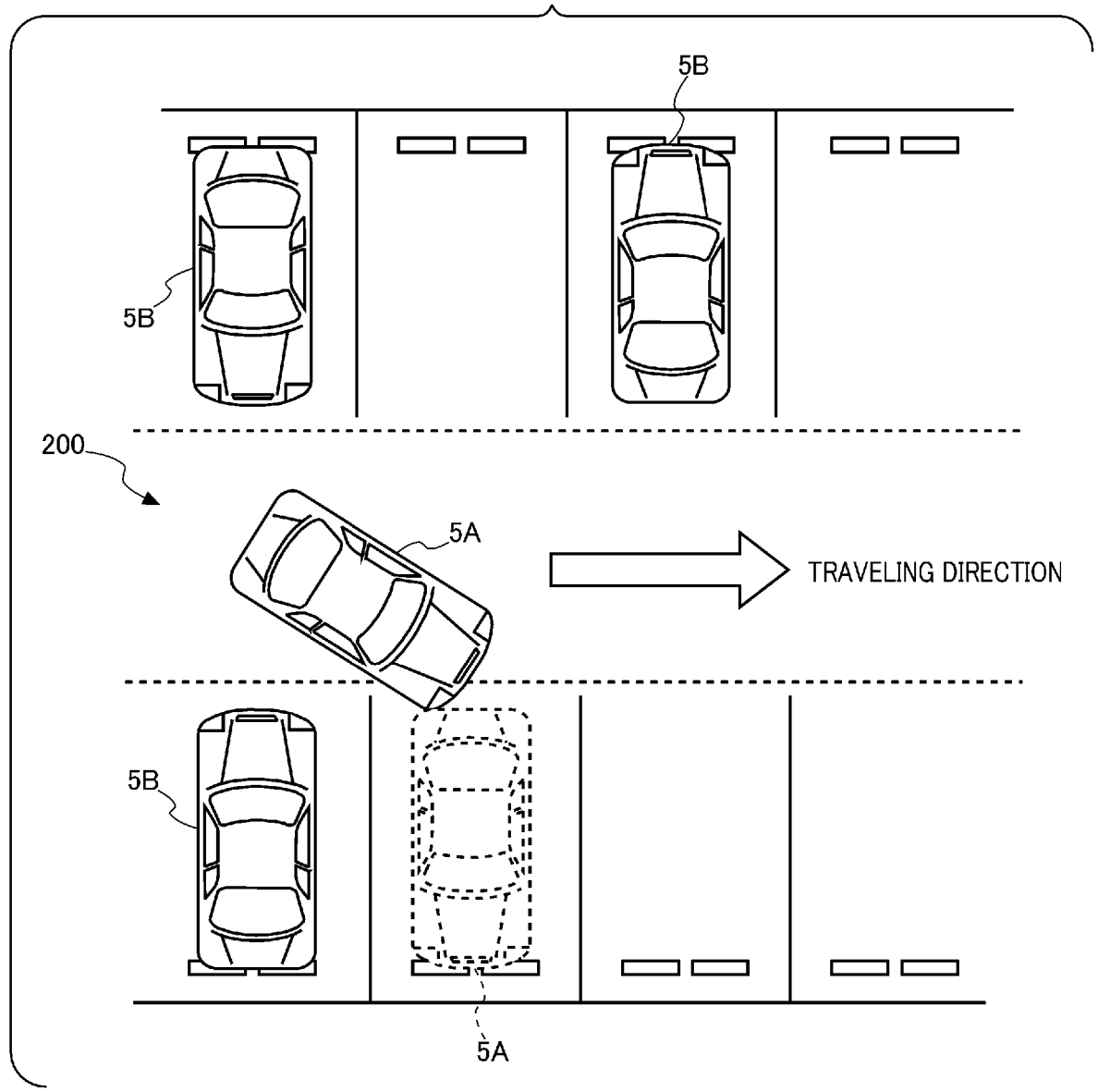
FIG. 10 is a diagram showing a case where the traveling direction of a roadway is toward the right direction and the own vehicle is parked forward.

FIG. 9 shows a case where the traveling direction of the roadway 200 is from the right to the left viewed from the driver seated on the driver seat. Further, FIG. 9 shows a case where the parking direction of the own vehicle 5A is forward parking, and the unparking direction of the own vehicle 5A is the backward direction. In this case, as shown in FIG. 10, the driver once moves the own vehicle 5A to the rear right side and starts running toward the left direction that is the traveling direction. The check direction determination unit 154 refers to the check direction table 47, and acquires "rear right side" as the check direction and θ2<θ≤θ3 as the detection range.

Figure 11:
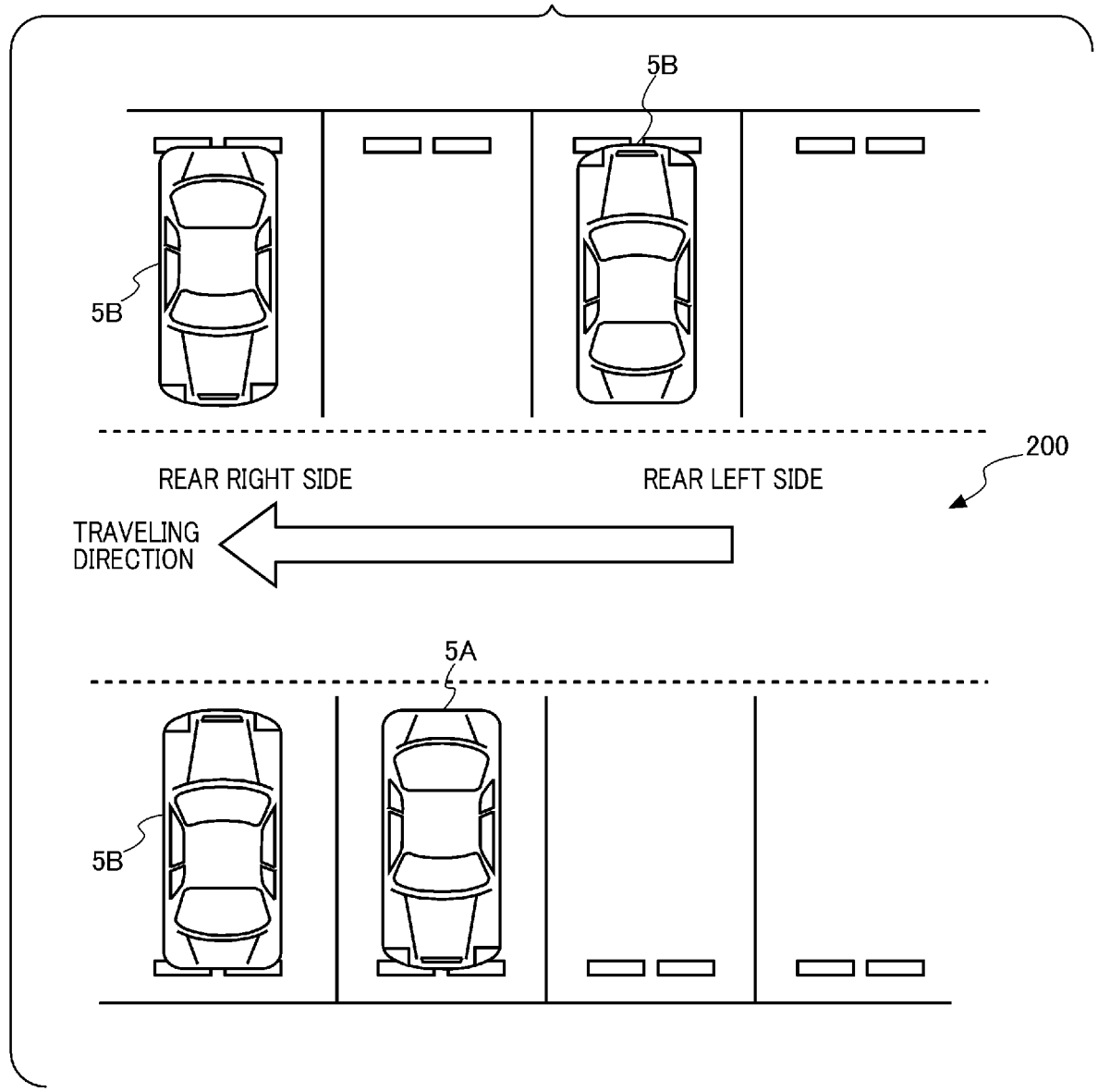
FIG. 11 is a diagram showing a case where the traveling direction of a roadway is toward the left direction and the own vehicle is parked forward.
Figure 12:
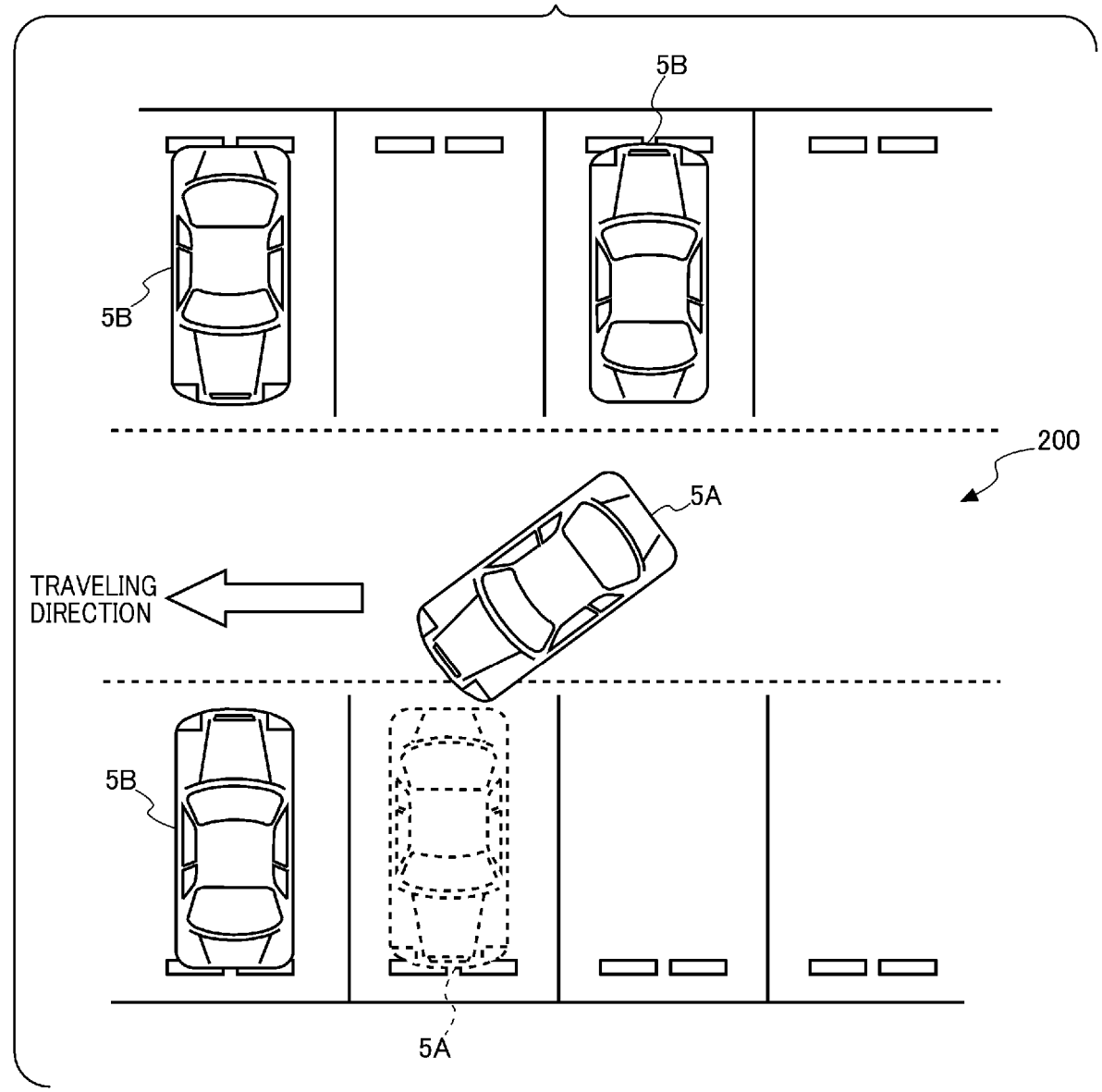
FIG. 12 is a diagram showing a case where the traveling direction of a roadway is toward the left direction and the own vehicle is parked forward.

FIG. 11 shows a case where the traveling direction of the roadway 200 is from the left to the right viewed from the driver seated on the driver seat. Further, FIG. 11 shows a case where the parking direction of the own vehicle 5A is forward parking, and the unparking direction of the own vehicle 5A is the backward direction. In this case, as shown in FIG. 12, the driver once moves the own vehicle 5A to the rear left side and starts running toward the right direction that is the traveling direction. The check direction determination unit 154 refers to the check direction table 47, and acquires "rear left side" as the check direction and θ5<θ≤θ6 as the detection range.

Figure 13:
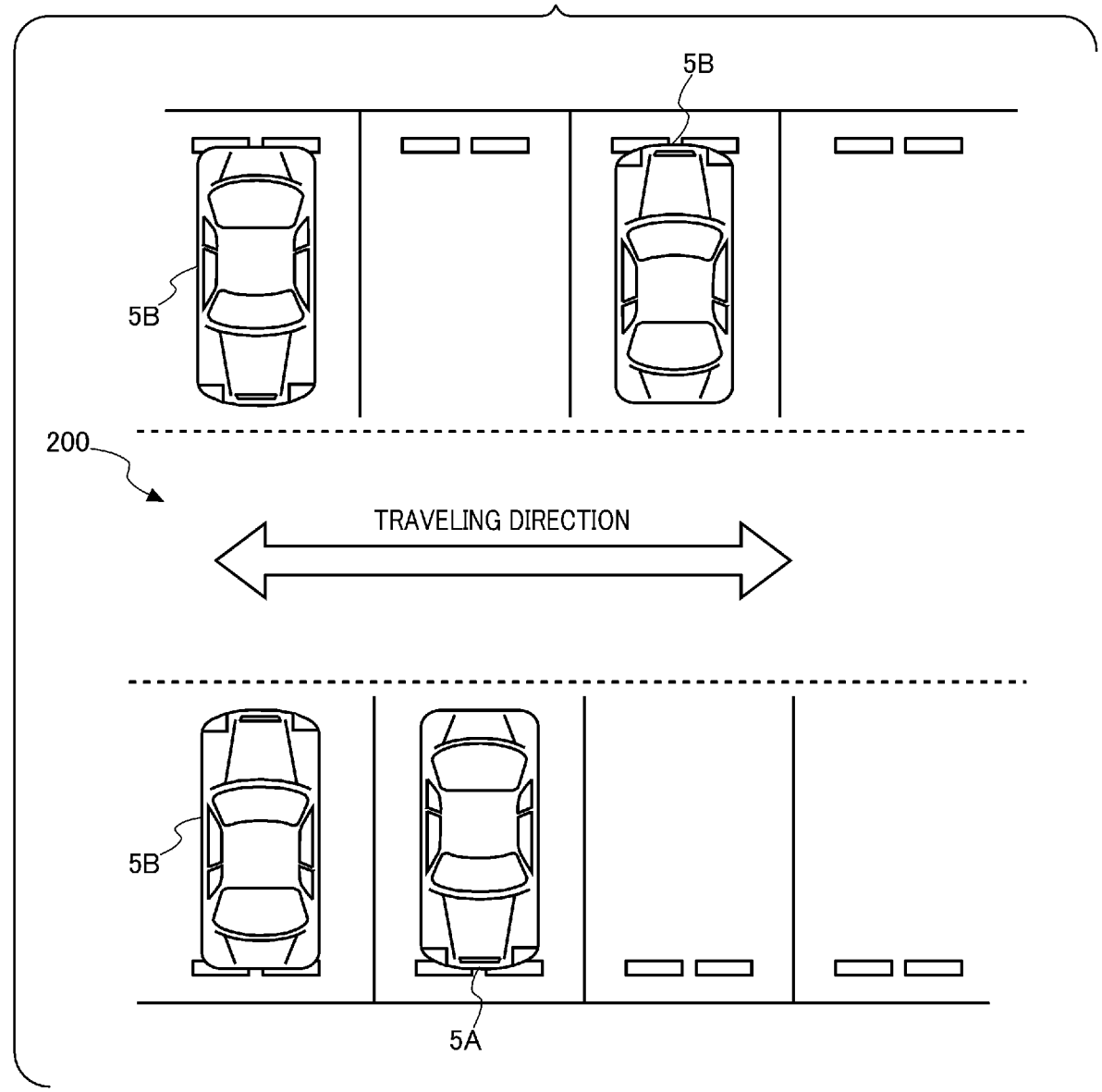
FIG. 13 is a diagram showing a case where the traveling direction of a roadway is toward both directions and the own vehicle is parked forward.

FIG. 13 shows a case where the traveling directions on the roadway 200 are two ways viewed from the driver seated on the driver seat. Further, FIG. 13 shows a case where the parking direction of the own vehicle 5A is forward parking, and the unparking direction of the own vehicle 5A is the backward direction. In this case, the driver once moves the own vehicle 5A to the rear left side or the rear right side and starts running toward the right direction or the left direction as the traveling direction. The check direction determination unit 154 refers to the check direction table 47, and acquires "rear left side and rear right side" as the check directions and θ5<θ≤θ6 and θ2<θ≤θ3 as the detection range.

The direction information acquisition unit 155 acquires the information showing at least one of the facing direction of the face of the driver and the line-of-sight direction of the driver as the direction information from the image processing unit 20. The direction information acquisition unit 155 outputs the direction information acquired from the image processing unit 20 to the check occurrence determination unit 156.

The check occurrence determination unit 156 determines whether or not the facing direction of the face of the driver or the line-of-sight direction is within the set detection range, based on the direction information inputted from the direction information acquisition unit 155, to determine whether or not the driver has done a safety check for the check direction.

When the information showing the facing direction of the face and the line-of-sight direction of the driver is inputted from the direction information acquisition unit 155 as the direction information, the check occurrence determination unit 156 determines whether or not the line-of-sight direction is within the detection range. When the line-of-sight direction of the driver stays within the detection range continuously for a prescribed length of time or more, the check occurrence determination unit 156 determines that the driver is doing the safety check for the check direction.

Further, the check occurrence determination unit 156 determines whether or not the facing direction of the face of the driver inputted from the direction information acquisition unit 155 as the direction information is within the detection range. When the facing direction of the face of the driver stays within the detection range continuously for a prescribed length of time or more, the check occurrence determination unit 156 determines that the driver is doing the safety check for the check direction. While the case where the detection range is the same for determining the line-of-sight direction and for determining the facing direction of the face is described in the present embodiment, the detection range for determining the line-of-sight direction and the detection range for determining the facing direction of the face may not be consistent.

The notification control unit 157 executes a notification action by controlling the display unit 50, the speaker 60, and the vibrator 70 when the check occurrence determination unit 156 determines that the driver has not done a safety check for the check direction. The notification control unit 157 notifies that there is a direction for which a safety check has not been done by displaying, on the display unit 50, a guidance showing the direction for which the safety check has not been done and by driving the speaker 60 and the vibrator 70, for example.

The tendency detection unit 158 registers the data to the loading/unloading record DB 43 and the driver DB 45, and detects the direction for which the driver tends to neglect the safety check. Upon detecting the direction for which the driver tends to neglect the safety check, the tendency detection unit 158 has the notification control unit 157 execute the notification action.

For example, the tendency detection unit 158 registers the direction information acquired by the direction information acquisition unit 155 and the check direction determined by the check direction determination unit 154 to the driver DB 45 to generate a record. Further, the tendency detection unit 158 records "1" as the notification flag when the notification control unit 157 executes the notification action, and records "0" as the notification flag when the notification control unit 157 does not execute the notification action. Furthermore, when the notification control unit 157 executes the notification action, the tendency detection unit 158 registers the contents of the executed notification action to the driver DB 45.

Further, when a plurality of records in which the direction information acquired by the direction information acquisition unit 155 and the check direction determined by the check direction determination unit 154 are the same and in which "1" is recorded as the notification flag are registered in the driver DB 45, the tendency detection unit 158 updates the accumulated value of the records. The accumulated value is updated to a value corresponding to the number of records in which the direction information and the check direction are the same and in which "1" is recorded as the notification flag.

When the accumulated value reaches a set value or more, the tendency detection unit 158 determines that there is a tendency of neglecting the safety check for the check direction. In the present embodiment, the tendency detection unit 158 determines that there is a tendency to neglect the safety check for the check direction when the accumulated value turns "2".

Then, when the direction information acquisition unit 155 acquires the direction same as the direction information registered in the record having the accumulated value equal to or more than the set value and also the check direction determination unit 154 determines the direction same as the check direction registered in the record, the tendency detection unit 158 has the notification control unit 157 execute the notification action.

Further, when it is determined by the check occurrence determination unit 156 that the safety check for the check direction has been done, the tendency detection unit 158 refers to the driver DB 45 and acquires the records in which the direction same as the check direction is registered.

The tendency detection unit 158 determines whether or not "0" is recorded in the notification flags of a plurality of continuous records registered most recently in the driver DB 45 among the acquired records. When the notification flags of the plurality of records registered most recently are "0", the tendency detection unit 158 determines that the driver does not have a tendency of neglecting the safety check for that check direction. In the present embodiment, when the notification flags of the two records registered most recently are "0", the tendency detection unit 158 determines that the driver does not have a tendency of neglecting the safety check for that check direction. In this case, the tendency detection unit 158 changes "1" recorded in the notification flags of the records in which the same check direction is registered to "0". Further, the tendency detection unit 158 updates the accumulated value of the records to "0".

Figure 14:
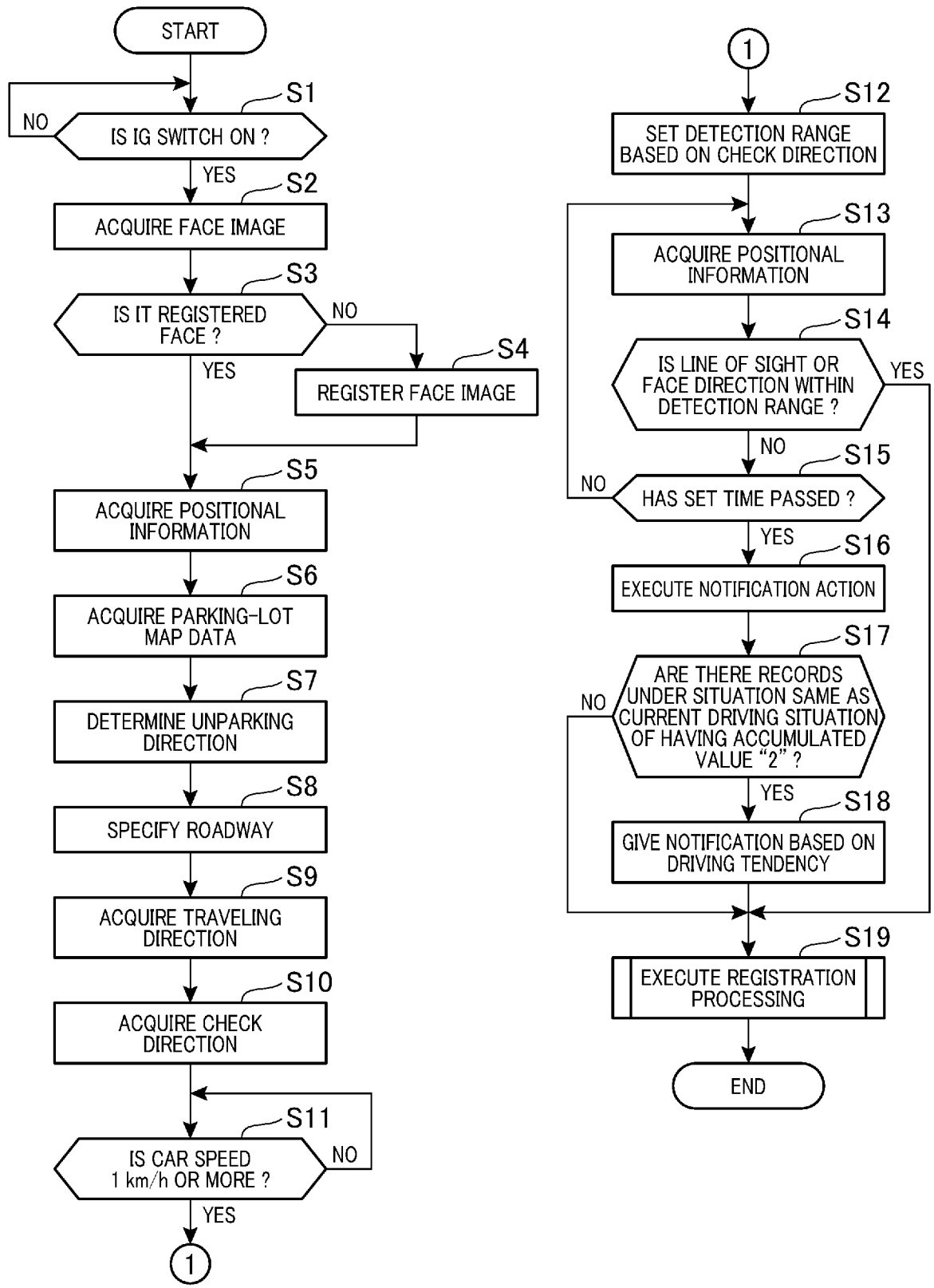
FIG. 14 is a flowchart showing an entire operation procedure of the safe drive assist apparatus.

FIG. 14 is a flowchart showing actions of the safe drive assist apparatus 1.

The actions of the safe drive assist apparatus 1 will be described by referring to the flowchart shown in FIG. 14.

The control unit 120 first determines whether or not the ignition switch is turned on (step S1). The control unit 120 determines whether or not the ignition switch is turned on based on the vehicle information inputted from the CAN I/F circuit 110. When the ignition switch is not turned on (NO in step S1), the control unit 120 waits for the ignition switch to be turned on.

When the ignition switch is turned on (YES in step S1), the control unit 120 acquires a face image of the driver. The control unit 120 gives an instruction to the onboard camera 10 to capture the image. The onboard camera 10 captures the image of the driver seated on the driver seat to generate a captured image, and outputs the generated captured image to the image processing unit 20. The image processing unit 20 extracts the face area from the inputted captured image, and outputs an image of the extracted face area to the control unit 120 as the face image. The face image is temporarily stored in the memory 130 of the control unit 120.

The control unit 120 acquires the face image from the memory 130 (step S2), and determines whether or not the acquired face image is registered in the driver DB 45 (step S3). When the face image has not been registered in the driver DB 45 (NO in step S3), the control unit 120 registers the face image of the driver to the driver DB 45 (step S4). At this time, the control unit 120 receives input of information such as the name, sex, age, and the like of the driver via a touch panel 55, and registers the received information to the driver DB 45.

Then, when the face image has been registered in the driver DB 45 (YES in step S3) or when registration of the face image of the driver is completed in step S4, the control unit 120 acquires the positional information outputted by the GPS reception unit 30 from the memory 130 (step S5). Upon receiving the positional information, the control unit 120 acquires the parking-lot map data 41 including the position indicated by the acquired positional information from the storage unit 40 (step S6). Step S6 corresponds to "acquisition step" of the present invention.

Then, the control unit 120 determines the unparking direction of the own vehicle 5A (step S7). The control unit 120 determines the unparking direction based on the operation position information that shows the operation position of the shift lever inputted as the vehicle information. Further, the control unit 120 may acquire the information of the parking direction registered in the loading/unloading record DB 43, and determine the unparking direction based on the acquired information. Step S7 corresponds to "unparking direction determination step" of the present invention.

Then, the control unit 120 specifies the roadway on which the own vehicle 5A unloaded from the stall runs first based on the parking-lot map data 41 acquired in step S6 and the unparking direction determined in step S7 (step S8). Step S8 corresponds to "roadway specification step" of the present invention. After specifying the roadway, the control unit 120 acquires the traveling direction of the specified roadway from the parking-lot map data 41 (step S9).

Upon acquiring the traveling direction of the specified roadway, the control unit 120 refers to the check direction table 47 based on the acquired traveling direction and the unparking direction determined in step S7, and acquires the information of the check direction corresponding to the unparking direction and the traveling direction (step S10). Step S10 corresponds to "check direction determination step" of the present invention.

Then, the control unit 120 determines whether or not the car speed of the own vehicle 5A is 1 km/h or faster according to car speed information inputted as the vehicle information (step S11). When the car speed of the own vehicle 5A is not 1 km/h or faster (NO in step S11), the control unit 120 waits until the car speed reaches 1 km/h.

Then, when the car speed of the own vehicle 5A is 1 km/h or faster (YES in step S11), the control unit 120 sets the detection range based on the check direction acquired in step S10 (step S12). When the check direction is the right direction, the control unit 120 sets the range of $\theta1 \le \theta \le \theta2$ in the right direction with respect to the forward axis A2 as the detection range. Further, when the check direction is the left direction, the control unit 120 sets the range of $\theta4 \le \theta \le \theta5$ in the left direction with respect to the forward axis A2 as the detection range. Furthermore, when the check direction is the rear left side, the control unit 120 sets the range of $\theta5 < \theta \le \theta6$ in the left direction with respect to the forward axis A2 as the detection range. Moreover, when the check direction is the rear right side, the control unit 120 sets the range of θ2<θ≤θ3 in the right direction with respect to the forward axis A2 as the detection range.

Then, the control unit 120 acquires the direction information of the driver detected by the image processing unit 20 (step S13). Step S13 corresponds to "direction information acquisition step" of the present invention. The direction information includes at least one of the line-of-sight direction and the facing direction of the face of the driver. The control unit 120 determines whether or not the line of sight or the facing direction of the head of the driver is within the detection range based on the acquired direction information (step S14). For example, when the line of sight of the driver is detected within the detection range continuously for a prescribed length of time or more, the control unit 120 determines that the line of sight of the driver is within the detection range (step S14). Further, when the direction of the face of the driver is determined to be facing toward the direction within the detection range continuously for a prescribed length of time or more, the control unit 120 determines that the facing direction of the face of the driver is within the detection range (step S14). When determined that the line of sight or the facing direction of the head of the driver is within the detection range (YES in step S14), the control unit 120 shifts to the processing of step S19. Step S14 corresponds to "check occurrence determination step" of the present invention.

Further, when determined that the line of sight or the facing direction of the head of the driver is not within the detection range (NO in step S14), the control unit 120 determines whether or not set time set in advance has passed (step S15). The set time may be the time after the car speed is determined as 1 km/h or more in step S11 or the time after the facing direction and the line of sight are detected first in step S13, for example.

When the set time has not passed (NO in step S15), the control unit 120 returns to step S13 to acquire the direction information. Further, even when the set time has passed but the line of sight or the facing direction of the head of the driver is not determined to be within the detection range (NO is step S14 and YES in step S15), the control unit 120 executes a notification action (step S16). For example, the control unit 120 controls the speaker 60 to output a notification sound to notify the driver that a careless driving is detected. Step S16 corresponds to "notification step" of the present invention.

Then, the control unit 120 determines whether or not registered data showing the accumulated value "2" and a driving situation same as the current driving situation of the driver, is registered in the driver DB 45 (step S17). Specifically, the control unit 120 determines whether or not there is a record in which the check direction is the same as the check direction acquired in step S10, the direction information is the same as the direction shown in the direction information acquired in step S13, and "2" is registered as the accumulated value. When there is no record with the accumulated value "2" (NO in step S17), the control unit 120 shifts to the processing of step S19.

Further, when there is a record with the accumulated value "2" registered in the driver DB 45 (YES in step S17), the control unit 120 executes a notification action based on the driving tendency (step S18). For example, the control unit 120 displays the driving tendency of the driver and the direction for which the driver has neglected the safety check on the display unit 50.

Thereafter, the control unit 120 performs registration processing for registering the data to the driver DB 45 (step S19).

Figure 15:
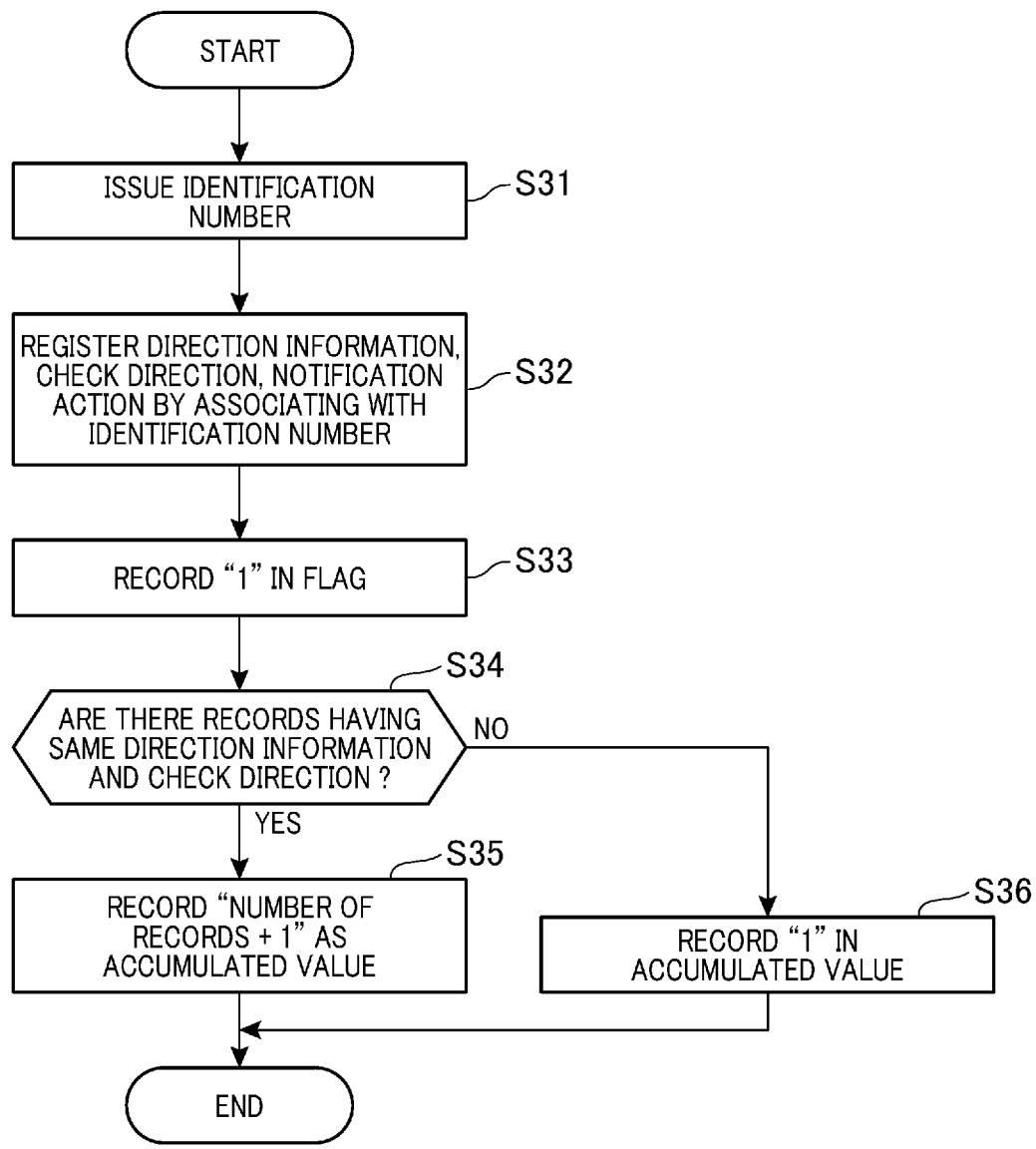
FIG. 15 is a flowchart showing update processing of the driver DB.

FIG. 15 is a flowchart showing the registration processing of the data to the driver DB 45 when the notification action is executed in step S16. The whole processing flow corresponds to "tendency detection step" of the present invention.

First, the control unit 120 issues a new identification number, and registers the issued identification number to the driver DB 45 to generate a record (step S31). Then, the control unit 120 registers the direction information, the check direction, and the notification action performed in step S16 to the record of the identification number issued and registered in step S31 (step S32). Further, the control unit 120 records "1" in the notification flag of this record (step S33).

Then, the control unit 120 searches the driver DB 45 and determines whether or not there is registered a record in which the direction information is the same as the direction information registered in step S32 and the check direction is the same as the check direction registered in step S32 (step S34).

When the record having the same direction information and the same check direction is detected (YES in step S34), the control unit 120 registers "the number of detected records+1" to the accumulated value of the record of the identification number issued in step S31 (Step S35). Note that "+1" is for the record registered this time in the driver DB 45. For example, when one record having the same direction information and the same check direction is detected from the driver DB 45, "2" is recorded as the accumulated value of the detected record and record registered this time.

Further, when no record having the same direction information and the same check direction is detected (NO in step S34), the control unit 120 registers "1" as the accumulated value of the record of the identification number issued in step S31 (step S36).

Figure 16:
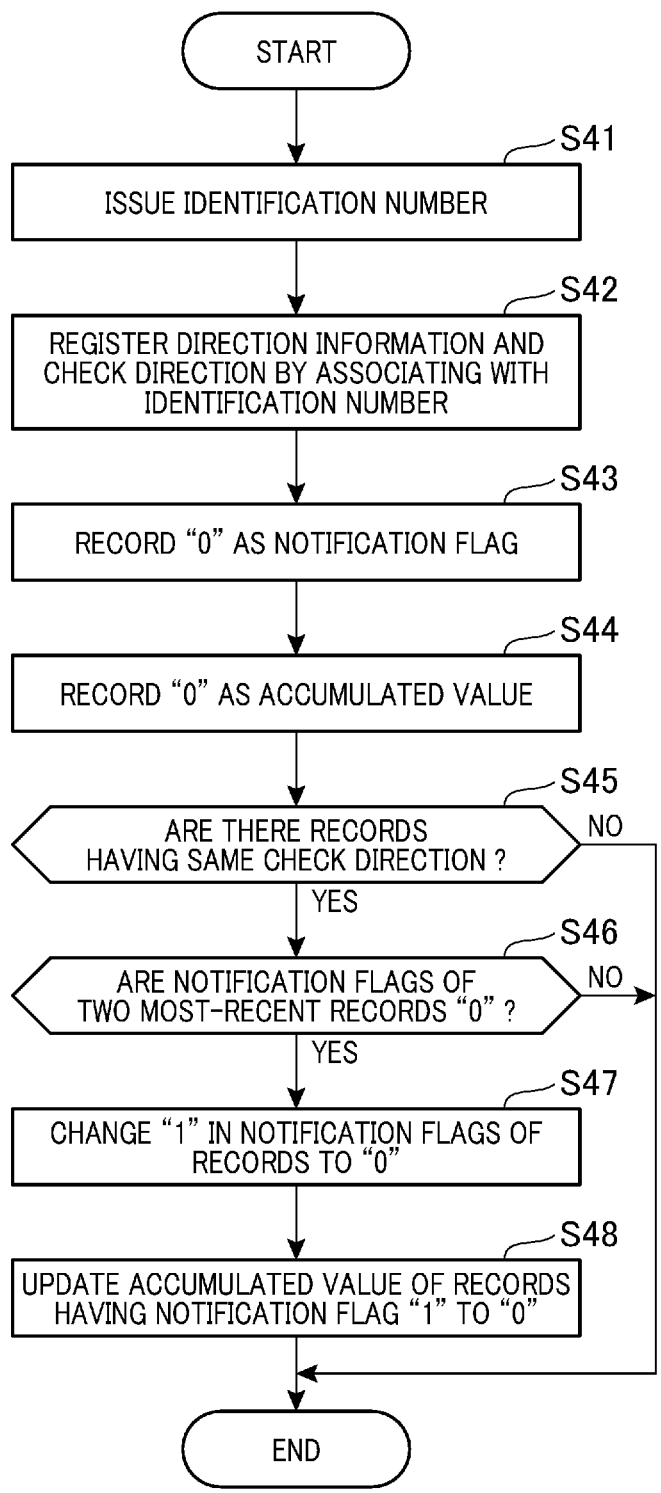
FIG. 16 is a flowchart showing update processing of the driver DB.

FIG. 16 is a flowchart showing update processing of the driver DB 45 executed when the notification action is not performed in step S16. The whole processing flow corresponds to "tendency detection step" of the present invention.

First, the control unit 120 issues a new identification number, and records the issued identification number to the driver DB 45 (step S41). Then, the control unit 120 registers the direction information and the check direction to the record of the identification number issued and registered in step S41 (step S42). Further, the control unit 120 records "0" in the notification flag of this record (step S43), and records "0" in the accumulated value (step S44).

Then, the control unit 120 searches the driver DB 45 and determines whether or not there is registered a record in which the check direction is the same as the check direction registered in step S42 (step S45). When there is no record in which the same check direction is registered (NO in step S45), the control unit 120 ends the processing flow.

Further, when there are records in which the same check direction is registered (YES in step S45), the control unit 120 determines whether or not the notification flags of the two records recorded most recently to the driver DB 45 among the records in which the same check direction is recorded, are "0" (step S46). That is, the control unit 120 determines whether or not the driver has done a safety check for the check direction, in the action for checking the same check direction, so that the safe drive assist apparatus 1 has not executed the notification action. When the notification flags of the two records registered most recently are not "0" (NO in step S46), the control unit 120 ends the processing flow.

Further, when the notification flags of the two records registered most recently are "0" (YES in step S46), the control unit 120 updates "1" in the notification flags of the records having the same check direction detected in step S45 to "0" (step S47). Further, the control unit 120 updates the corresponding accumulated value to "0" in the records having the same check direction detected in step S45 and "1" registered in the notification flags (step S48).

Figure 17:
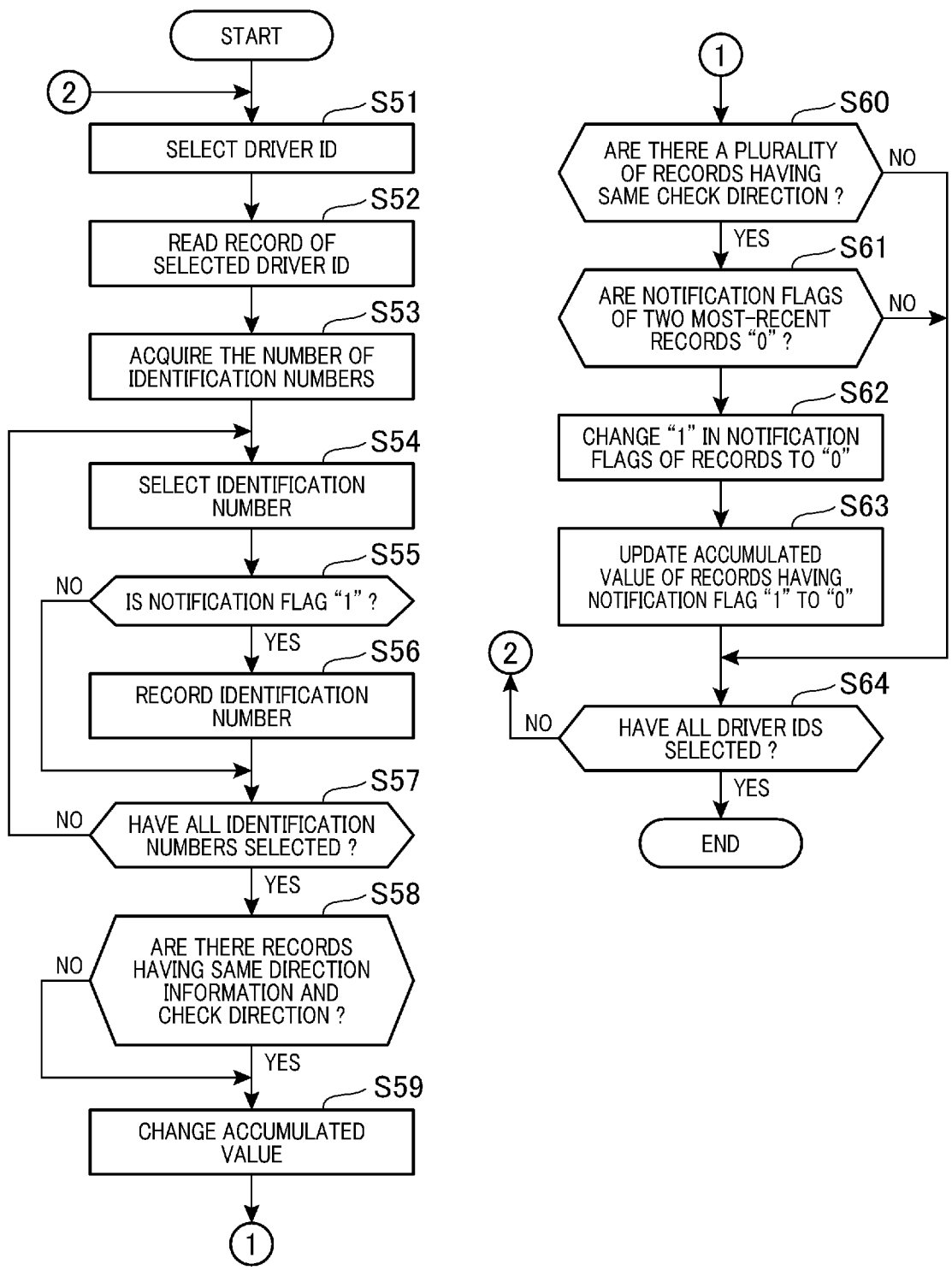
FIG. 17 is a flowchart showing a processing procedure when executing update processing of the driver DB.

FIG. 17 is a flowchart showing the procedure of the update processing of the driver DB 45. In particular, FIG. 17 is a flowchart showing the processing procedure when performing the update processing of the driver DB 45 at a timing set in advance.

The control unit 120 first selects one registered driver ID (step S51), and reads the records registered by being associated with the selected driver ID (step S52). Then, the control unit 120 counts and acquires the number of identification numbers included in each of the read records (step S53).

Then, the control unit 120 selects one identification number included in the records read in step S52 (step S54), and determines whether or not the notification flag associated with the selected identification number is "1" (step S55). When the notification flag is not "1" (NO in step S55), the control unit 120 shifts to determination of step S57.

Further, when the notification flag is "1" (YES in step S55), the control unit 120 records the identification number in the memory 130 (step S56). Then, the control unit 120 determines whether or not all the identification numbers are selected (step S57). When not all the identification numbers are selected (NO in step S57), the control unit 120 returns to step S54 to select the next identification number.

Further, when all the identification numbers are selected (YES in step S57), the control unit 120 determines whether or not there are records having the same direction information and the same check direction among the records of the identification number recorded in the memory 130 in step S56 (step S58). When there is no record having the same direction information and the same check direction (NO in step S58), the control unit 120 shifts to determination of step S60.

Further, when there are records having the same direction information and the same check direction (YES in step S58), the control unit 120 changes the accumulated value of those records to the number corresponding to the number of detected records (step S59).

Then, the control unit 120 searches for the records of the driver ID selected in step S51, and determines whether or not there are plurality of records in which the same direction is registered as the check direction (step S60). The target records searched in step S60 are not the records of the identification number registered in the memory 130 in step S56 but all the records read in step S52.

When there are not a plurality of records in which the same check direction is registered (NO in step S60), the control unit 120 shifts to determination of step S64. Further, when there are a plurality of records in which the same check direction is registered (YES in step S60), the control unit 120 determines whether or not values of the notification flags of the two records registered most recently in the driver DB 45, among these records, are "0" (step S61). When the values of the notification flags of the two records registered most recently are not "0" (NO in step S61), the control unit 120 shifts to determination of step S64.

Further, when the notification flags of the two records registered most recently are "0" (YES in step S61), the control unit 120 updates "1" in the notification flags of the records having the same check direction detected in step S60 to "0" (step S62). Further, the control unit 120 updates the corresponding accumulated value to "0" in the records having the same check direction detected in step S60 and "1" registered in the notification flags (step S63).

Then, the control unit 120 determines whether or not all the driver IDs are selected (step S64). When all the driver IDs are selected (YES in step S64), the control unit 120 ends the processing flow. Further, when not all the driver IDs are selected (NO in step S64), the control unit 120 returns to processing of step S51.

Figure 18:
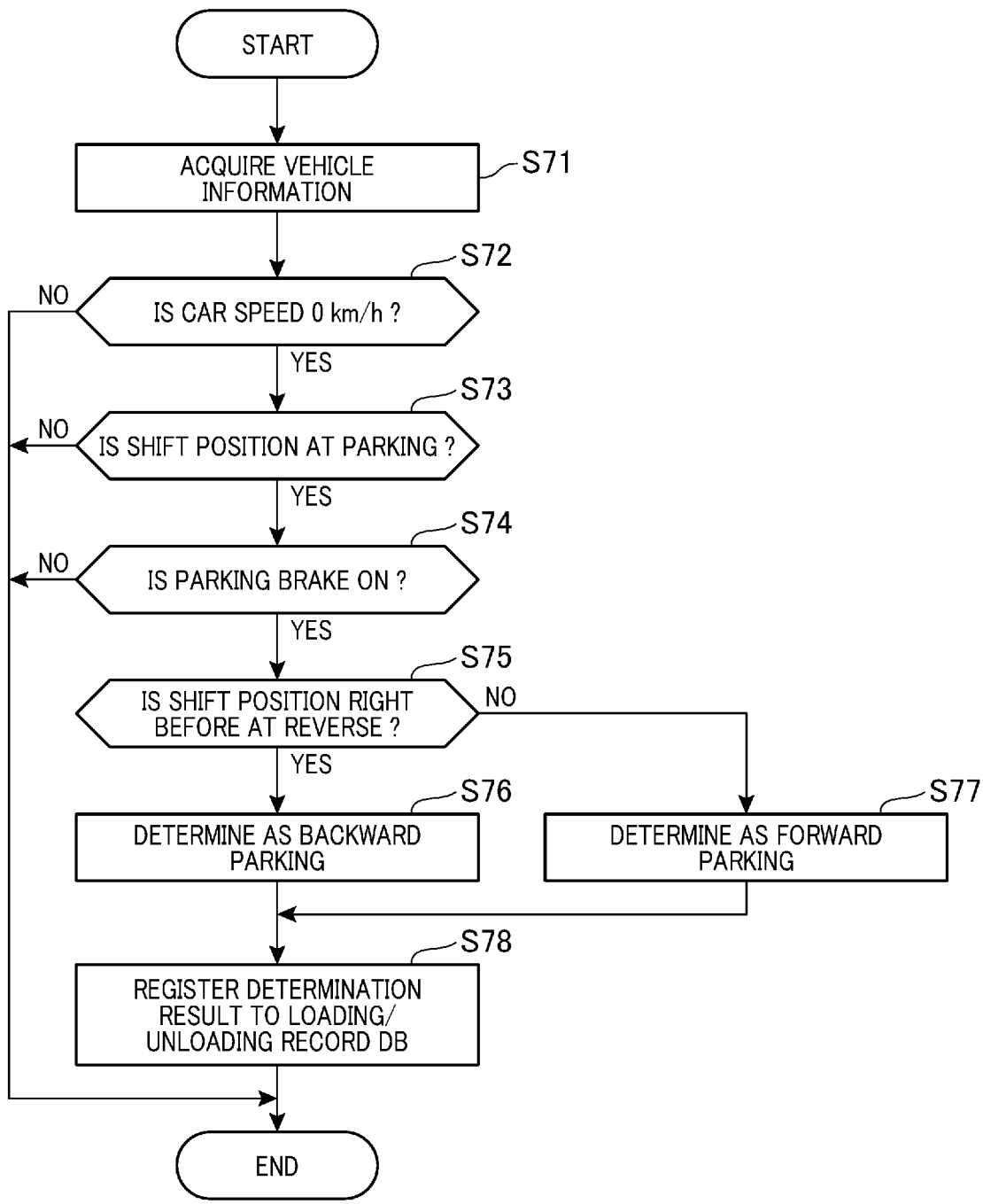
FIG. 18 is a flowchart showing a flow when determining whether or not the own vehicle is parked.

FIG. 18 shows a processing flow for determining whether or not the own vehicle 5A is parked in a stall. The control unit 120 first acquires the vehicle information via the CAN I/F circuit 110 (step S71). Step S71 corresponds to "vehicle information acquisition step" of the present invention.

First, the control unit 120 determines whether or not the car speed included in the vehicle information is "0 km/h" (step S72). When the car speed is not "0 km/h" (NO in step S72), the control unit 120 ends the processing flow. Further, when the car speed is "0 km/h"(YES in step S72), the control unit 120 determines whether or not the shift position of the shift lever included in the vehicle information is at parking (step S73). When the shift position is not at parking (NO in step S73), the control unit 120 ends the processing flow.

Further, when the shift position is at parking (YES in step S73), the control unit 120 determines whether or not the parking brake included in the vehicle information is on (step S74). When the parking brake is not on (NO in step S74), the control unit 120 ends the processing flow. Further, when the parking brake is on (YES in step S74), the control unit 120 determines whether or not the shift position right before parking included in the vehicle information is at reverse (step S75).

When the shift position right before is at reverse (YES in step S75), the control unit 120 determines that the parking direction of the own vehicle 5A is backward parking (step S76). The control unit 120 records the determined parking direction to the parking direction of the loading/unloading record DB 43 (step S78). Further, when the shift position right before is at drive (NO in step S75), the control unit 120 determines that the parking direction of the own vehicle 5A is forward parking (step S77). The control unit 120 records the determined parking direction in the parking direction of the loading/unloading record DB 43 (step S78).

As described above, the in-vehicle apparatus 100 of the present embodiment includes the unparking direction determination unit 152, the roadway specification unit 153, the check direction determination unit 154, the direction information acquisition unit 155, the check occurrence determination unit 156, and the notification control unit 157.

The unparking direction determination unit 152 determines the unparking direction of the own vehicle 5A.

The roadway specification unit 153 acquires the parking-lot map data including the information of the traveling direction of the roadway within the parking lot based on the positional information received at the GPS reception unit 30. Further, the roadway specification unit 153 specifies the roadway adjacent to the stall where the own vehicle 5A is parked based on the acquired parking-lot map data, positional information, and unparking direction.

Before the own vehicle 5A enters the roadway, the check direction determination unit 154 determines the check direction for which the driver of the own vehicle 5A needs to do the checking action for checking the safety based on the traveling direction of the roadway specified by the roadway specification unit 153 and the unparking direction.

The direction information acquisition unit 155 acquires the information of at least one of the facing direction of the head and the line of sight of the driver.

The check occurrence determination unit 156 sets the detection range based on the check direction determined by the check direction determination unit 154, and determines whether or not the facing direction of the head or the line of sight of the driver acquired by the direction information acquisition unit 155 is within the detection range so as to determine occurrence of the safety check.

The notification control unit 157 controls the display unit 50, the speaker 60, or the vibrator 70 to execute the notification action when the check occurrence determination unit 156 determines that no checking action has been done.

Therefore, the notification action is executed by the display unit 50, the speaker 60, or the vibrator 70 when the driver neglects the safety check for the direction required to do the safety check, so that it is possible to improve the safety when unparking the vehicle parked in the parking lot.

Further, the roadway adjacent to the stall where the own vehicle 5A is parked is specified, and the check direction for which the driver needs to do the checking action for checking the safety is determined based on the traveling direction of the specified roadway. Therefore, the direction required to do the safety check can be determined with high accuracy.

Further, the in-vehicle apparatus 100 includes the tendency detection unit 158 that detects the driving tendency of the driver.

The tendency detection unit 158 registers, to the driver DB 45, the record in which the check direction determined by the check direction determination unit 154, the direction information acquired by the direction information acquisition unit 155, and occurrence information showing the occurrence of the notification action are associated.

Then, the tendency detection unit 158 calculates the accumulated value of the number of records in which the occurrence information shows that a notification action has occurred, and the check direction determined by the check direction determination unit 154 and the direction information acquired by the direction information acquisition unit 155 are consistent. When the calculated accumulated value is equal to or more than a set number, the tendency detection unit 158 gives an instruction to the notification control unit 157 to execute a notification action.

Therefore, when the check direction and the direction information corresponding to the check direction are the same and the number of times which the notification action is done is equal to or more than the set number, it is possible to execute the notification action by determining that the driver tends to neglect the safety check for the check direction.

Further, when the check occurrence determination unit 156 determines that a checking action has occurred, the tendency detection unit 158 acquires the records in which the check direction same as the check direction determined by the check direction determination unit 154 is registered, from the driver DB 45.

Then, when it is determined that the checking action is done continuously for a plurality of times for the check direction based on the acquired records, the tendency detection unit 158 changes, among the acquired records, the occurrence information of the records indicating that the notification action has occurred to the occurrence information indicating that the notification action has not occurred.

Therefore, when the driver executes the checking action continuously for a plurality of times for the check direction, it is possible to control the notification control unit 157 not to execute the notification action by determining that the driver does not have a tendency of neglecting the safety check.

Further, the in-vehicle apparatus 100 includes the vehicle information acquisition unit 151 that acquires the vehicle information of the own vehicle 5A.

The unparking direction determination unit 152 determines the parking direction of the own vehicle 5A based on the car speed and the operation position information of the shift lever included in the vehicle information. Further, the unparking direction determination unit 152 determines the unparking direction based on the determined parking direction.

This makes it possible to improve the accuracy for determining the unparking direction of the own vehicle 5A because the unparking direction of the own vehicle 5A is determined based on the parking direction. Therefore, accuracy for specifying the roadway adjacent to the stall can be improved, thereby making it possible to improve the accuracy for determining the check direction.

The embodiment described above is a preferable embodiment of the present invention. However, the present invention is not limited to the embodiment described above but various kinds of modifications are possible without departing from the scope of the present invention. For example, while the case of unloading the own vehicle 5A parked in the stall of the parking lot from the stall is described in the above embodiment, it is also possible to apply the processing of the present invention even for a case where the own vehicle 5A unloaded from the stall runs on the roadway. Further, it is also possible to apply the processing of the present invention even for a case where the own vehicle 5A that has entered the parking lot runs on the roadway to park in a prescribed stall. Furthermore, the embodiment described above can also be applied to a case where the own vehicle 5A is parallel parked.

Further, FIG. 1 is a schematic diagram in which the functional configuration of the safe drive assist apparatus 1 is classified according to the main processing contents in order to facilitate understanding of the present invention, and the configuration of the safe drive assist apparatus 1 can be classified into a still greater number of structural elements according to the processing contents. Further, a single structural element may be classified to execute still greater kinds of processing. Furthermore, the processing of each structural element may be executed by a single piece of hardware or a plurality of pieces of hardware. Moreover, the processing of each structural element may be executed by a single program or a plurality of programs.

Further, the program executed by the processor 150 in the control unit 120 shown in FIG. 1 may be downloaded from an external server via a communication network, loaded on the memory 130, and executed by the processor 150, for example. Further, the program may be directly loaded on the memory 130 from the external server via the communication network, and executed by the processor 150. Alternatively, the program may be loaded on the memory 130 from a storage medium connected to the control unit 120.

Further, the processing steps of the flowcharts shown in FIG. 14 to FIG. 18 are divided according to the main processing contents in order to facilitate understanding of the processing executed by the control unit 120. There is no limit to be set on the present invention by the way of how the processing steps are divided and the names thereof. The processing of the control unit 120 can be divided into still greater number of processing steps according to the processing contents. Furthermore, a single processing step may further be divided to include still greater kinds of processing. Moreover, the processing orders of each of the flowcharts described above are not limited to the examples shown in the drawings as long as the same processing results can be acquired.

Further, when implementing the control method of the in-vehicle apparatus according to the present invention by using a computer, the program to be executed by the computer may be configured as a form of recording medium or a form of transmission medium that transmits the program. A magnetic recording medium, optical recording medium, or a semiconductor memory device can be used as the recording medium. Specifically, examples thereof may be removable or fixed recording media such as a flexible disk, an HDD (Hard Disk Drive), a CD-ROM (Compact Disk Read Only memory), a DVD, a Blu-ray® Disc, a magneto-optical disk, a flash memory, and a card recording medium. Further, the recording medium described above may be a nonvolatile storage apparatus such as a RAM, a ROM, or an HDD provided to the in-vehicle apparatus 100.

REFERENCE SIGNS LIST

1 Safe drive assist apparatus
5A Own vehicle
5B Other vehicles
10 Onboard camera
20 Image processing unit
30 GPS reception unit
40 Storage unit
41 Parking-lot map data
43 Loading/unloading record DB
45 Driver DB
47 Check direction table
55 Touch panel
60 Speaker
70 Vibrator
100 In-vehicle apparatus
110 CAN I/F circuit
115 CAN bus
120 Control unit
130 Memory
135 Control program
150 Processor
151 Vehicle information acquisition unit
152 Unparking direction determination unit
153 Roadway specification unit
154 Check direction determination unit
155 Direction information acquisition unit
156 Check occurrence determination unit
157 Notification control unit
158 Tendency detection unit
200 Roadway

What is claimed is:

1. An in-vehicle apparatus comprising:
a processor; and
a memory storing a check direction table in which an unparking direction of an own vehicle, a traveling direction of a roadway, a check direction, and a detection range are registered in association with each other, wherein the processor
determines the unparking direction of the own vehicle in which the in-vehicle apparatus is loaded;
receives positioning signals transmitted from a GPS satellite, and calculates a latitude and a longitude of the own vehicle as positional information based on the received positioning signals;
acquires parking-lot map information including information of the traveling direction of the roadway within a parking lot based on the positional information wherein the traveling direction of the roadway is orthogonal to the unparking direction of the own vehicle, and the traveling direction of the roadway is one way from a left of the unparking direction of the own vehicle, one way from a right of the unparking direction of the own vehicle, or a two-way pass;
specifies the roadway adjacent to a stall where the own vehicle is parked based on the parking-lot map information, the positional information, and the unparking direction of the own vehicle;
determines the check direction of the one way from the left or the right of the unparking direction of the own vehicle or the two-way pass for which a driver of the own vehicle needs to do a checking action for checking safety before the own vehicle enters the roadway by referring to the check direction table;
acquires direction information showing at least one of a line of sight or a facing direction of a face of the driver driving the own vehicle;
sets the detection range in the check direction by referring to the check direction table based on the check direction and determines whether or not at least one of the line of sight or the facing direction of the face of the driver is within the detection range so as to determine occurrence of the checking action;
controls a display, a speaker, or a vibrator disposed in the own vehicle to execute a notification action when determining that the checking action by the driver has not occurred;
stores, in the memory, records associating the check direction, the direction information, and occurrence information showing whether or not the notification action has occurred;
registers, in the memory, contents of the notification action when the notification action occurred, and updates accumulated value corresponding to number of records in which the direction information and check direction are the same;
detects a direction in which the driver tends to neglect checking safety when the accumulated value reaches a set value or more; and
gives an instruction to execute an action to notify the driver the direction in which the driver tends to neglect checking safety and a direction for which the driver has neglected checking safety, based on the direction in which the driver tends to neglect checking safety, wherein the direction in which the driver tends to neglect checking safety is left of the unparking direction of the own vehicle, right of the unparking direction of the own vehicle, or left and right of the unparking direction of the own vehicle.

2. The in-vehicle apparatus according to claim 1, wherein the processor
acquires the records, in which the check direction which is the same direction as the determined check direction is already registered, from the memory when it is determined that the checking action by the driver has occurred; and
among the acquired records, changes the occurrence information of the records indicating that the notification action has occurred to the occurrence information indicating that there is no notification action, when determined that the checking action by the driver continuously occurs for a plurality of times for the check direction based on the acquired records.

3. The in-vehicle apparatus according to claim 1, wherein the processor acquires vehicle information of the own vehicle,
determines a parking direction of the own vehicle based on a car speed and operation position information of a shift lever included in the vehicle information, and determines the unparking direction of the own vehicle based on the determined parking direction.

4. A control method of an in-vehicle apparatus including a processor and a memory storing a check direction table in which an unparking direction of an own vehicle, a traveling direction of a roadway, a check direction, and a detection range are registered in association with each other, the method comprising:
an unparking direction of the own vehicle determination step of determining the unparking direction of the own vehicle in which the in-vehicle apparatus is loaded;
a position information acquisition step of receiving positioning signals transmitted from a GPS satellite, and calculating a latitude and a longitude of the own vehicle as positional information based on the received positioning signals;
an acquisition step of acquiring parking-lot map information including information of the traveling direction of the roadway within a parking lot based on the positional information wherein the traveling direction of the roadway is orthogonal to the unparking direction of the own vehicle, and the traveling direction of the roadway is one way from a left of the unparking direction of the own vehicle, one way from a right of the unparking direction of the own vehicle, or two-way pass;
a roadway specification step of specifying the roadway adjacent to a stall where the own vehicle is parked based on the parking-lot map information acquired by the acquisition step, the positional information, and the unparking direction of the own vehicle;
a check direction determination step of determining a check direction of the one way from the left or the right of the unparking direction of the own vehicle or the two-way pass for which a driver of the own vehicle needs to do a checking action for checking safety before the own vehicle enters the roadway by referring to the check direction table;
a direction information acquisition step of acquiring direction information showing at least one of a line of sight or a facing direction of a face of the driver driving the own vehicle;
a check occurrence determination step of setting the detection range in the check direction by referring to the check direction table based on the check direction determined by the check direction determination step, and determining whether or not at least one of the line of sight or the facing direction of the face of the driver acquired by the direction information acquisition step is within the detection range so as to determine occurrence of the checking action;
a notification step of controlling a display, a speaker, or a vibrator disposed in the own vehicle to execute a notification action when determined by the check occurrence determination step that the checking action by the driver has not occurred;
records associating the check direction determined by the check direction determination step, the direction information acquired by the direction information acquisition step, and occurrence information showing whether or not the notification action has occurred are stored in a memory;
a registration and update step of registering, in the memory, contents of the notification action when the notification action occurred, and updating accumulated value corresponding to number of records in which the direction information and check direction are the same;
a tendency detection step of detecting a direction in which the driver tends to neglect checking safety when the accumulated value reaches a set value or more; and
when the accumulated value is equal to or more than a set number, an action to notify the driver the direction in which the driver tends to neglect checking safety and a direction for which the driver has neglected checking safety is executed, based on the direction in which the driver tends to neglect checking safety, wherein the direction in which the driver tends to neglect checking safety is left of the unparking direction of the own vehicle, right of the unparking direction of the own vehicle, or left and right of the unparking direction of the own vehicle.

5. The control method of the in-vehicle apparatus according to claim 4, wherein, in the tendency detection step:
the records, in which the check direction which is the same direction as the determined check direction by the check direction determination step is already registered, are acquired from the memory, when it is determined in the check occurrence determination step that the checking action by the driver has occurred; and
among the acquired records, the occurrence information of the records indicating that there is the notification action is changed to the occurrence information indicating that there is no notification action, when it is determined that the checking action by the driver continuously occurs for a plurality of times for the check direction based on the acquired records.

6. The control method of the in-vehicle apparatus according to claim 4, comprising a vehicle information acquisition step of acquiring vehicle information of the own vehicle, wherein
in the unparking direction of the own vehicle determination step, a parking direction of the own vehicle is determined based on a car speed and operation position information of a shift lever included in the vehicle information, and the unparking direction of the own vehicle is determined based on the determined parking direction.

* * * * *